US012737892B2

(12) United States Patent
Macazaga Zuazo et al.

(10) Patent No.: US 12,737,892 B2
(45) Date of Patent: Sep. 15, 2026

(54) SYSTEM AND METHODS FOR AUTOMATED PHOTOSENSITIVITY DETECTION

(71) Applicant: Electronic Arts Inc., Redwood City, CA (US)

(72) Inventors: Blanca Macazaga Zuazo, Madrid (ES); Alessandro Lentini, Madrid (ES); Angela Stockinger, Madrid (ES)

(73) Assignee: Electronic Arts Inc., Redwood City, CA (US)

(*) Notice: Subject to any disclaimer, the term of this patent is extended or adjusted under 35 U.S.C. 154(b) by 245 days.

(21) Appl. No.: 18/622,363

(22) Filed: Mar. 29, 2024

(65) Prior Publication Data

US 2025/0166203 A1 May 22, 2025

Related U.S. Application Data

(60) Provisional application No. 63/601,105, filed on Nov. 20, 2023.

(51) Int. Cl.
*G06T 7/37* (2017.01)
*G06T 7/00* (2017.01)
(Continued)

(52) U.S. Cl.
CPC .............. *G06T 7/11* (2017.01); *G06T 7/0002* (2013.01); *G06T 7/136* (2017.01); *G06T 7/37* (2017.01);
(Continued)

(58) Field of Classification Search
CPC ......... G06T 7/11; G06T 7/0002; G06T 7/136; G06T 7/37; G06T 7/90;
(Continued)

(56) References Cited

U.S. PATENT DOCUMENTS 10,467,803 B1 * 11/2019 Degtyarev ................ G06T 5/70
10,956,022 B2 * 3/2021 Karunamuni ....... G06F 3/04845
(Continued)

FOREIGN PATENT DOCUMENTS

JP 2020123313 A * 8/2020 ......... G06F 3/04883

OTHER PUBLICATIONS

Tripathi, Rishabh, et al. "Detection of flashy segment in youtube videos using computer vision technique to prevent seizure in epilepsy patients." 2023 8th International Conference on Communication and Electronics Systems (ICCES). IEEE, 2023.*
(Continued)

*Primary Examiner* — Shefali D Goradia
(74) *Attorney, Agent, or Firm* — Knobbe, Martens, Olson & Bear, LLP

(57) ABSTRACT

The systems and methods described herein provide for an automated photosensitivity detection system (PDS) configured to automatically execute processes for flash detection and pattern detection of a video. PDS outputs an analysis result for each type of pattern detection analysis for the video. The PDS can execute each type of pattern detection analysis independently of the other pattern detection processes. Each pattern detection process is a distinct process that can be calculated without reference to the other processes. The final analysis result can aggregate the results of each detection process executed by the PDS.

20 Claims, 21 Drawing Sheets

(51) Int. Cl.
*G06T 7/11* (2017.01)
*G06T 7/136* (2017.01)
*G06T 7/90* (2017.01)

(52) U.S. Cl.
CPC ...... *G06T 7/90* (2017.01); *G06T 2207/10016* (2013.01); *G06T 2207/10024* (2013.01); *G06T 2207/20076* (2013.01)

(58) Field of Classification Search
CPC . G06T 2207/10016; G06T 2207/10024; G06T 2207/20076; G06V 20/44; G06V 10/431; G06V 10/56; G06V 20/49; G06V 10/25; G06V 20/46; A63F 13/00
See application file for complete search history.

(56) References Cited

U.S. PATENT DOCUMENTS

| | | | | |
|---|---|---|---|---|
| 2012/0042289 | A1* | 2/2012 | Cragun ............... | G06F 16/9577<br>715/865 |
| 2024/0015367 | A1* | 1/2024 | Robbin ................ | H04N 21/482 |

OTHER PUBLICATIONS

Schmalstieg, Dieter, and Daniel Wagner. “Experiences with hand-held augmented reality.” 2007 6th IEEE and ACM International Symposium on Mixed and Augmented Reality. IEEE, 2007.*

Kothari, Jaisal, and Ashay Srivastava. “Flikcer—a chrome extension to resolve online epileptogenic visual content with real-time luminance frequency analysis.” arXiv preprint arXiv:2108.09491 (2021).*

* cited by examiner (a) Frame 1

(b) Frame 2

(c) Frame 3

(d) Frame 4

(a) Frame 1/2

(b) Frame 2/3

(c) Frame 3/4

(a) Frame 1

(b) Frame 2

(c) Frame 3

(d) Frame 4

(a) Frame 1/2

(b) Frame 2/3

(c) Frame 3/4

| Frame | New Transition | Transition Count |
|---|---|---|
| 0 | No | 0 |
| 1 | No | 0 |
| 2 | Yes | 1 |
| 3 | Yes | 2 |
| 4 | Yes | 3 |
| 5 | Yes | 4 |
| 6 | No | 3 |
| 7 | Yes | 4 |
| 8 | Yes | 4 |

FIG. 8A (b) Thresholded power spectrum (a) Power spectrum (a) Original grayscale image (b) Inverse Fourier Transform (IFT)

(a) Absolute difference of the original (b) Otsu threshold of the absolute difference grayscale image and IFT image

| Frame | PatternArea | PatternDetectedLines | PatternFrameResult |
|---|---|---|---|
| 1 | 79.62% | 17 | 0 |
| 2 | 79.62% | 17 | 0 |
| 3 | 79.62% | 17 | 0 |
| 4 | 79.62% | 17 | 0 |
| 5 | 79.62% | 17 | 0 |
| 6 | 79.62% | 17 | 0 |
| 7 | 79.62% | 17 | 0 |
| 8 | 79.62% | 17 | 0 |
| 9 | 79.62% | 17 | 0 |
| 10 | 79.62% | 17 | 0 |
| 11 | 79.62% | 17 | 0 |
| 12 | 79.62% | 17 | 1 |
| 13 | 79.62% | 17 | 1 |
| 14 | 79.62% | 17 | 1 |
| 15 | 79.62% | 17 | 1 |
| 16 | 79.62% | 17 | 1 |
| 17 | 79.62% | 17 | 1 |
| 18 | 79.62% | 17 | 1 |
| 19 | 79.62% | 17 | 1 |
| 20 | 79.62% | 17 | 1 |
| 21 | 79.62% | 17 | 1 |
| 22 | 79.62% | 17 | 1 |
| 23 | 79.62% | 17 | 1 |
| 24 | 79.62% | 17 | 1 |
| 25 | 79.62% | 17 | 1 |

FIG. 13

SYSTEM AND METHODS FOR AUTOMATED PHOTOSENSITIVITY DETECTION

CROSS REFERENCE TO RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Photosensitive epilepsy (PSE) is a form of epilepsy, a neurological disorder that can prompt seizures to individuals when triggered. In the case of PSE, the triggers that cause epileptic seizures are visual stimuli, such as flashing lights or geometric patterns.

The triggers that lead to seizures due to PSE can be both natural or artificial, as they can be caused by natural light, e.g., sunlight shimmering off water, streetlights or by the changing visual components in TVs and computer screens. Another factors like tiredness, stress or excitement, or the effect taking up all your field of vision, (frequent states when playing video games), and being very close to a screen during a long time without breaks, may increase the photosensitive risk.

There are certain characteristics regarding flickering or patterned images that can induce seizures, including intensity, duration, distance from the source, background illumination, diffusion of the pattern, contrast, type of pattern, color, open versus closed eyes, one versus two-eye viewing, and stage of sleep-wakefulness cycle.

SUMMARY

The present disclosure includes techniques described herein that relate to a system including: one or more processors; and one or more memory devices, wherein the one or more memory devices are communicatively coupled to the one or more processors, the one or memory devices storing computer-executable instructions including at least an automated photosensitivity flash detection module, wherein execution of the computer-executable instructions configure the one or more processors to: receive video data including a plurality video frames arranged sequentially, each of individual frames including a plurality of pixels; convert each frame of the video from a colorspace to a detection value; determine a frame variance between consecutive frames, wherein the frame variance determines a portion of the frame that between the consecutive frames; determine whether the frame variance satisfies a flash area threshold, wherein the flash area threshold is a percentage of a total area of the frame; determine average frame variation values for the plurality of frames; accumulate the average frame variation values for the plurality of video frames; determine flash transitions for the plurality of video frames based on the average frame variation values; track a number of flash transitions over a defined time period throughout the plurality of video frames; determine whether the number of flash transitions satisfies at least one flash threshold for the video data; and output an indication of whether the video data satisfies the at least one flash threshold.

In some aspects, the techniques described herein relate to a system, wherein a transition occurs when the accumulation of the average frame variation values of multiple frames satisfies a flash transition threshold.

In some aspects, the techniques described herein relate to a system, wherein execution of the computer-executable instructions further configure the one or more processors to set a flash trend based at least in part on the accumulation of the average frame variation values.

In some aspects, the techniques described herein relate to a system, wherein a flash is detected when two transitions occur.

In some aspects, the techniques described herein relate to a system, wherein the detection value is a luminance value or a red saturation value.

In some aspects, the techniques described herein relate to a system, wherein execution of the computer-executable instructions further configure the one or more processors to determine whether the number of flash transitions satisfies at least one flash threshold for the video data for red saturation and luminance independently.

In some aspects, the techniques described herein relate to a system, wherein the at least one flash threshold includes a maximum flash threshold and an extended flash threshold, wherein the maximum flash threshold is a first number of flashes within a first defined time period, and the extended flash threshold is a second number of flashes within a second defined time period.

In some aspects, the techniques described herein relate to a system, wherein the maximum flash threshold is three flashes over any one second time period of the video data.

In some aspects, the techniques described herein relate to a system, wherein a flash transition occurs when the accumulation of the average frame variation values satisfy a transition threshold.

In some aspects, the techniques described herein relate to a system, wherein the transition threshold for luminance is different the transition threshold for red saturation.

In some aspects, the techniques described herein relate to a computer-implemented method to for photosensitivity flash detection including: receiving video data including a plurality video frames arranged sequentially, each of individual frames including a plurality of pixels; converting each frame of the video from a colorspace to a detection value; determining a frame variance between consecutive frames, wherein the frame variance determines a portion of the frame that between the consecutive frames; determining whether the frame variance satisfies a flash area threshold, wherein the flash area threshold is a percentage of a total area of the frame; determining average frame variation values for the plurality of frames; accumulating the average frame variation values for the plurality of video frames; determining flash transitions for the plurality of video frames based on the average frame variation values; tracking a number of flash transitions over a defined time period throughout the plurality of video frames; determining whether the number of flash transitions satisfies at least one flash threshold for the video data; and outputting an indication of whether the video data satisfies the at least one flash threshold.

In some aspects, the techniques described herein relate to a method, wherein a transition occurs when the accumulation of the average frame variation values of multiple frames satisfies a flash transition threshold.

In some aspects, the techniques described herein relate to a method further including setting a flash trend based at least in part on the accumulation of the average frame variation values.

In some aspects, the techniques described herein relate to a method, wherein a flash is detected when two transitions occur.

In some aspects, the techniques described herein relate to a method, wherein the detection value is a luminance value or a red saturation value.

In some aspects, the techniques described herein relate to a method further including determining whether the number of flash transitions satisfies at least one flash threshold for the video data for red saturation and luminance independently.

In some aspects, the techniques described herein relate to a method, wherein the at least one flash threshold includes a maximum flash threshold and an extended flash threshold, wherein the maximum flash threshold is a first number of flashes within a first defined time period, and the extended flash threshold is a second number of flashes within a second defined time period.

In some aspects, the techniques described herein relate to a method, wherein the maximum flash threshold is three flashes over any one second time period of the video data.

In some aspects, the techniques described herein relate to a method, wherein a flash transition occurs when the accumulation of the average frame variation values satisfy a transition threshold.

In some aspects, the techniques described herein relate to a non-transitory computer readable medium storing instructions that, when executed by one or more processors, causes to perform a method including: receiving video data including a plurality video frames arranged sequentially, each of individual frames including a plurality of pixels; converting each frame of the video from a colorspace to a detection value; determining a frame variance between consecutive frames, wherein the frame variance determines a portion of the frame that between the consecutive frames; determining whether the frame variance satisfies a flash area threshold, wherein the flash area threshold is a percentage of a total area of the frame; determining average frame variation values for the plurality of frames; accumulating the average frame variation values for the plurality of video frames; determining flash transitions for the plurality of video frames based on the average frame variation values; tracking a number of flash transitions over a defined time period throughout the plurality of video frames; determining whether the number of flash transitions satisfies at least one flash threshold for the video data; and outputting an indication of whether the video data satisfies the at least one flash threshold.

In some aspects, the techniques described herein relate to a system including: one or more processors; and one or more memory devices, wherein the one or more memory devices are communicatively coupled to the one or more processors, the one or memory devices storing computer-executable instructions including at least an automated photosensitivity pattern detection module, wherein execution of the computer-executable instructions configure the one or more processors to: receive video data including a plurality video frames arranged sequentially, each of the individual frames including a plurality of pixels; convert each frame of the video from a first colorspace to a second colorspace; for each frame within the video data, detect a pattern region within the frame; validate a pattern within the pattern region of the frame; determine whether the pattern violates a pattern criteria; in response to a determination that the pattern violates the pattern criteria within the frame, track a number of frames that include the pattern; determine whether the number of frames satisfies at least one pattern threshold for the video data; and output an indication of whether the video data satisfies the at least one pattern threshold.

In some aspects, the techniques described herein relate to a system, wherein the pattern criteria defines a number of repeating elements, a pattern area threshold, and a threshold luminance difference in relative luminance between lighter and darker elements of the pattern.

In some aspects, the techniques described herein relate to a system, wherein the at least one pattern threshold defines a threshold period of time, wherein execution of the computer-executable instructions further configure the one or more processors to determine whether the pattern is displayed for greater than the threshold period of time.

In some aspects, the techniques described herein relate to a system, wherein to detect a pattern region within the frame, execution of the computer-executable instructions further configure the one or more processors to, determine a Fourier transform of the frame; determine a magnitude spectrum based on the Fourier transform; determine a power spectrum based on the Fourier transform; and detect a pattern region of the pattern based at least in part on the magnitude spectrum and the power spectrum.

In some aspects, the techniques described herein relate to a system, wherein to detect a pattern region within the frame, execution of the computer-executable instructions further configure the one or more processors to, determine an inverse Fourier transform of the frame to generate a modified image of the frame; determine an absolute difference between the frame and the modified frame; and detect the pattern region based at least in part on an absolute difference threshold applied to the difference between the frame and the modified frame.

In some aspects, the techniques described herein relate to a system, wherein to detect a pattern region within the frame, execution of the computer-executable instructions further configure the one or more processors to, convert the modified image into a binary image using an Otsu threshold; apply at least one of dilation or erosion operations to the binary image resulting in an eroded image; apply a contour operation on the eroded image; and generate a pattern region mask based at least in part on the contour operation, wherein the pattern region mask defines boundaries of the pattern region within the frame.

In some aspects, the techniques described herein relate to a system, wherein to validate a pattern within the pattern region of the frame, execution of the computer-executable instructions further configure the one or more processors to, determine a number of dark and light components of the pattern; determine an average luminance of the dark and light components of the pattern; and determine a relative luminance between the dark and light components of the pattern.

In some aspects, the techniques described herein relate to a system, wherein execution of the computer-executable instructions further configure the one or more processors to determine the number of dark and light components of the pattern using an Otsu threshold.

In some aspects, the techniques described herein relate to a system, wherein execution of the computer-executable instructions further configure the one or more processors to determine a pattern area based on the pattern region and determine whether the pattern area satisfies a pattern area threshold.

In some aspects, the techniques described herein relate to a system, wherein the first colorspace is RGB and the second colorspace is greyscale.

In some aspects, the techniques described herein relate to a computer-implemented method to for photosensitivity flash detection including: receiving video data including a plurality video frames arranged sequentially, each of the individual frames including a plurality of pixels; converting each frame of the video from a first colorspace to a second colorspace; for each frame within the video data, detecting a pattern region within the frame; validating a pattern within the pattern region of the frame; determining whether the pattern violates a pattern criteria; in response to a determination that the pattern violates the pattern criteria within the frame, tracking a number of frames that include the pattern; determining whether the number of frames satisfies at least one pattern threshold for the video data; and outputting an indication of whether the video data satisfies the at least one pattern threshold.

In some aspects, the techniques described herein relate to a method, wherein the pattern criteria defines a number of repeating elements, a pattern area threshold, and a threshold luminance difference in relative luminance between lighter and darker elements of the pattern.

In some aspects, the techniques described herein relate to a method, wherein the at least one pattern threshold defines a threshold period of time, and further including determining whether the pattern is displayed for greater than the threshold period of time.

In some aspects, the techniques described herein relate to a method, wherein detecting a pattern region within the frame, further includes, determining a Fourier transform of the frame; determining a magnitude spectrum based on the Fourier transform; determining a power spectrum based on the Fourier transform; and detecting a pattern region of the pattern based at least in part on the magnitude spectrum and the power spectrum.

In some aspects, the techniques described herein relate to a method, wherein detecting a pattern region within the frame, further includes, determining an inverse Fourier transform of the frame to generate a modified image of the frame; determining an absolute difference between the frame and the modified frame; and detecting the pattern region based at least in part on an absolute difference threshold applied to the difference between the frame and the modified frame.

In some aspects, the techniques described herein relate to a method, wherein detecting a pattern region within the frame, further includes, converting the modified image into a binary image using an Otsu threshold; applying at least one of dilation or erosion operations to the binary image resulting in an eroded image; applying a contour operation on the eroded image; and generating a pattern region mask based at least in part on the contour operation, wherein the pattern region mask defines boundaries of the pattern region within the frame.

In some aspects, the techniques described herein relate to a method, wherein validating a pattern within the pattern region of the frame, further includes: determining a number of dark and light components of the pattern; determining an average luminance of the dark and light components of the pattern; and determining a relative luminance between the dark and light components of the pattern.

In some aspects, the techniques described herein relate to a method further including determining the number of dark and light components of the pattern using an Otsu threshold.

In some aspects, the techniques described herein relate to a method further including determining a pattern area based on the pattern region and determine whether the pattern area satisfies a pattern area threshold.

In some aspects, the techniques described herein relate to a non-transitory computer readable medium storing instructions that, when executed by one or more processors, causes to perform a method including: receiving video data including a plurality video frames arranged sequentially, each of the individual frames including a plurality of pixels; converting each frame of the video from a first colorspace to a second colorspace; for each frame within the video data, detecting a pattern region within the frame; validating a pattern within the pattern region of the frame; determining whether the pattern violates a pattern criteria; in response to a determination that the pattern violates the pattern criteria within the frame, tracking a number of frames that include the pattern; determining whether the number of frames satisfies at least one pattern threshold for the video data; and outputting an indication of whether the video data satisfies the at least one pattern threshold.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

This disclosure will be more fully understood from the following detailed description taken in conjunction with the accompanying drawings, in which:

FIGS. 6A and 6B illustrate examples of luminance calculations within video frames from a videogame.

FIGS. 8A and 8B illustrate examples of luminance analysis results.

FIG. 13 illustrates an example of pattern detection analysis results.

DETAILED DESCRIPTION

Overview

Figure 1:
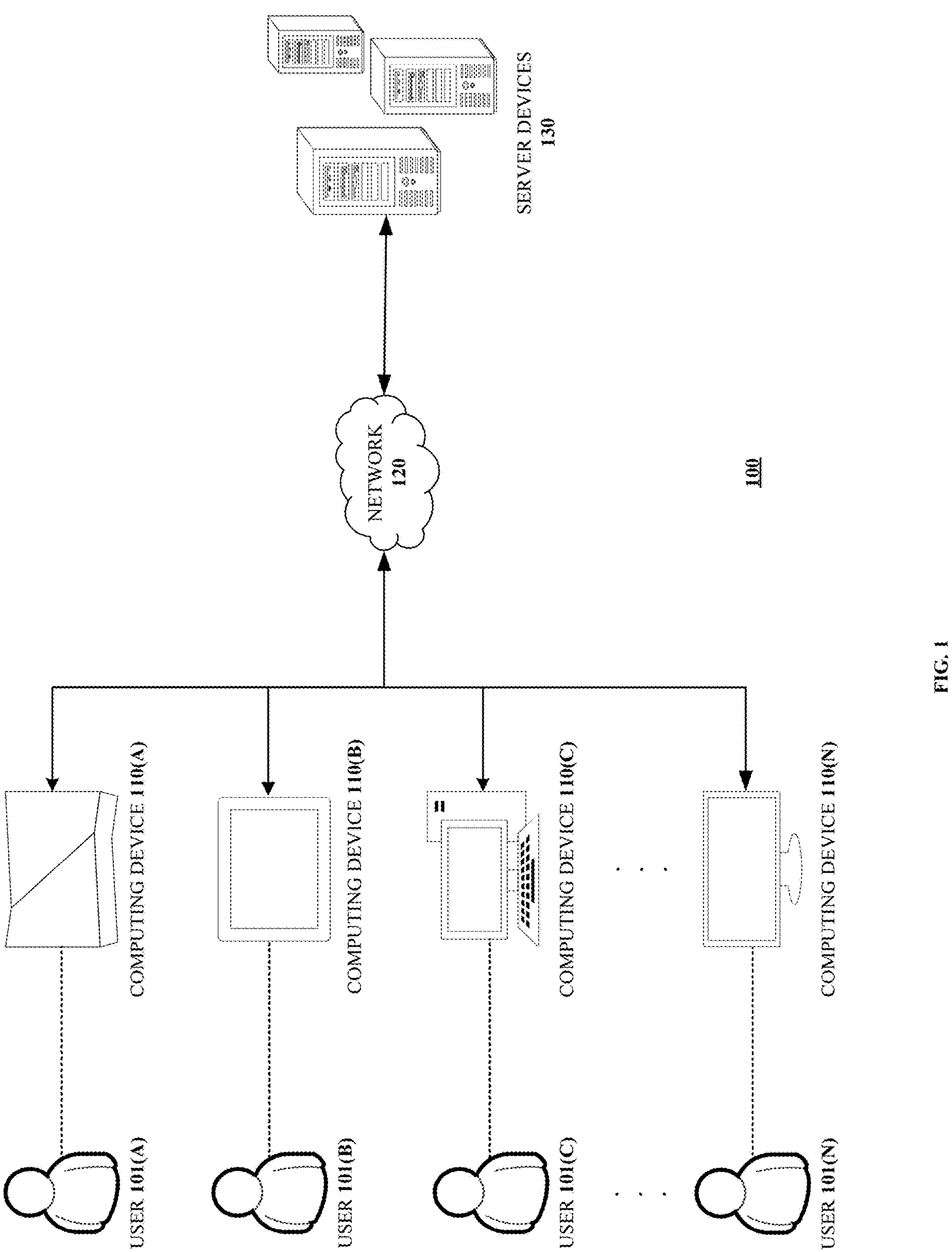
FIG. 1 illustrates a hardware environment, according to an example embodiment.

The systems and methods described herein provide for an automated photosensitivity detection system for virtual interactive environments, such as those among video games and/or virtual social spaces.

The photosensitivity detection system (PDS) is configured to analyze a video to run a compliance check for photosensitivity. The PDS can analyze flashes and patterns that could be potentially harmful within video data. Such potential harms can be based in whole or in part on established photosensitivity guidelines, such as ITU-R, Ofcom, and WCAG. The PDS can be configured to analyze videos based on different criteria, such as different standards from different jurisdictions.

The PDS is configured to automatically execute processes for flash detection and pattern detection of a video. PDS outputs an analysis result for each type of pattern detection analysis for the video. The PDS can execute each type of pattern detection analysis independently of the other pattern detection processes. Each pattern detection process is a distinct process that can be calculated without reference to the other processes. The final analysis result can aggregate the results of each detection process executed by the PDS. Each type of pattern detection needs to pass the analysis for the video to pass. In other words, if any of the pattern detection processes generate a fail result, the video fails.

Each frame of the video data is analyzed according the specifics of the type of PD process. Based on the analysis, the PDS generates corresponding photosensitivity data. The photosensitivity data is compared to corresponding photosensitivity criteria for determining whether the video passes. A photosensitivity analysis result is generated. The photosensitivity analysis result can aggregate the results of all of the executed processes. The analysis result can be output for review by a user. The analysis result may be output within a user interface, such as an interface of a video game, a video player application, an overlay within the video player/game, another application, or stored as a separate file. For example, the output can be a file (e.g., a CSV file) that provides the results of each analysis aggregated in a single document. For purposes of the photosensitivity analysis, if the luminance, red saturation, or pattern analysis fails the criteria, the video fails the photosensitivity analysis.

As described herein, a "flash" refers to two opposing changes in luminance or red saturation: an increase followed by a decrease, or a decrease followed by an increase, either in luminance or red saturation. As described herein, a "transition" refers to one of the opposing changes that are part of a flash. As described herein, "flash value" refers to the values of luminance and red saturation that are calculated and tracked for flash detection. As described herein, "flash threshold" refers to the minimum flash value that a transition has to equal or surpass in order to be considered part of a flash. The flash threshold can be a luminance threshold or a red saturation threshold. As described herein, "flash area threshold" refers to a minimum area of a frame that a change in luminance or red saturation to be considered part of a flash. For example, a change that satisfies the flash threshold, but does not satisfy the flash area threshold is not considered part of a flash because the area is too small. The flash area threshold may be represented as a percentage of the frame or display, such as, 25% of the screen display. As described herein, a "luminance flash" refers to a pair of two luminance transitions where one has a negative value and the other a positive one, or vice versa, where these values are equal or above the luminance flash threshold (e.g., 0.1 or −0.1) and are equal or above the flash area threshold (e.g., occupy at least 25% or more of the video frame area). As described herein, a "red saturation flash" refers to a pair of two red saturation transitions where one has a negative value and the other a positive one, or vice versa, where these values are equal or above red saturation flash threshold (e.g., 20 or −20) and are equal or above the flash area threshold (e.g., occupy at least 25% or more of the video frame area). As described herein, a "spatial pattern" refers to a set of components of similar shape and luminance. As described herein, a "spatial harmful pattern" refers to a set of components of similar shape and luminance where there are more than a threshold number of light-dark pairs of components in any orientation (e.g., 5 pairs of light-dark straight lines). The components can be composed of straight or curved lines.

Computing Environment

FIG. 1 illustrates an example embodiment of computing environment 100 to design, develop, test, and/or play a video game—or one or more aspects, features, and/or services thereof—among other things. Computing environment 100 includes communicatively coupled hardware devices. In some embodiments, one or more hardware devices among computing environment 100 include computer executable instructions configured to automate photosensitivity detection.

As shown, computing environment 100 including users 105(A), 105(B), 105(C), and 105(N) (collectively referred to herein as "105" or "users 105") and computing devices 110(A), 110(B), 110(C), and 110(D) (collectively referred to herein as "110 or "computing devices 110") that are communicatively coupled to server devices 130 over network 120. In some embodiments, "N" of user 105(N) and computing devices 110(N) is an arbitrary real value that denotes an "A through N" number of users 105 and/or computing devices 110 among computing environment 100.

Users 105 can be players, developers, designers and/or automated agents (hereinafter "agent" in short), among other types. In some embodiments, there is a one-to-one correspondence between the users 105 and the computing devices 110. In some embodiments, there is an N-to-one or one-to-N (wherein "N" is an arbitrary real value) correspondence between the users 105 and the computing devices 110. It should be understood that as described in the present disclosure, a "user" on or of a computing device is synonymous with a "player", "developer", "designer" or an "agent". An agent, as known to a person of ordinary skill in the art, can be configured by way of a machine learning model and/or software to automate one or more tasks; such as, for example, playing or testing a video game.

Computing devices 110 are exemplary hardware devices including computer executable instructions configured for designing, developing, maintaining, monitoring, analyzing, testing, updating, streaming, and/or playing a video game—or one or more aspects, features, and/or services thereof—among other things. As illustrated by way of example in the embodiment of FIG. 1, computing device 110(A) is a video game console; computing device 110(B) is a mobile device; computing device 110(C) is a personal computer; and computing device 110(D) is a display device. In some embodiments, two or more of the computing devices 110 are similar to one another—e.g., of a same type.

In some embodiments, user 105 provides input to computing devices 110 by way of one or more input devices and/or input methods corresponding and/or associated to computing devices 110, as known to a person of ordinary skill in the art. In some embodiments, computing devices 110 can provide output to users 105 by way of one or more output devices and/or output methods corresponding and/or associated to computing devices 110, as known to a person of ordinary skill in the art.

Network 120 communicatively couples computing devices 110 and server devices 130, among other hardware devices. In some embodiments, network 120 includes any method of private and/or public connectivity, networking, and/or communication between or among hardware devices known in the arts. As non-limiting examples, network 120 may include direct wired connections, Near Field Communication (NFC), a Local Area Network (LAN), a Virtual Private Network (VPN), an internet connection, or other communication methods of the like.

Server devices 130 are exemplary hardware devices including computer executable instructions configured to provide services (i.e., remote or cloud services) corresponding to designing, developing, maintaining, monitoring, analyzing, testing, updating, streaming, and/or playing of a video game—or one or more aspects and/or features thereof—among other things to computing devices 110 over network 120. The one or more hardware devices of server devices 130 can be communicatively coupled to one or more computing devices 110 over network 120, among other hardware devices and/or other networking methods.

The exemplary hardware devices of computing devices 110 and server devices 130 include at least one or more processors, graphic processors, memory, and storage, in addition to networking capabilities. In some embodiments, computing devices 110 include computer executable instructions configured to perform one or more functions, tasks, or services of and/or for service devices 130. In some embodiments, server devices 130 include computer executable instructions configured to perform one or more functions, tasks, or services of and/or for computing devices 110.

In some embodiments, computing devices 110 and server devices 130 include computer executable instructions configured to provide and/or enable remote access among hardware devices, such as over network 120. For example, computing device 110(A) may remote access computing device 110(C) and/or one or more hardware devices of server devices 130. In some embodiments, computing devices 110 include computer executable instructions configured to request and/or provide data to server devices 130, such as over network 120. In some embodiments, server devices 130 include computer executable instructions configured to request and/or provide data to computing devices 110, such as over network 120.

In some embodiments, there is an association of a user 105 to one or more user accounts of, or corresponding to, computing devices 110 and/or service devices 130. In some embodiments, there is an association of a user 105 to one or more user accounts corresponding to software and/or video games included, stored, and/or executed among computing devices 110 and/or service devices 130. In some embodiments, user accounts in association with a user 105 are validated by computing devices 110 and/or service devices 130 by one or more methods known to a person of ordinary skill in the art. In some embodiments, agents—as users 105—are deployed, controlled, and/or directed by computing devices 110 and/or service devices 130 by one or more methods known to a person of ordinary skill in the art to perform and/or automate one or more tasks among computing devices 110 and/or service devices 130, among other things.

Figure 2:
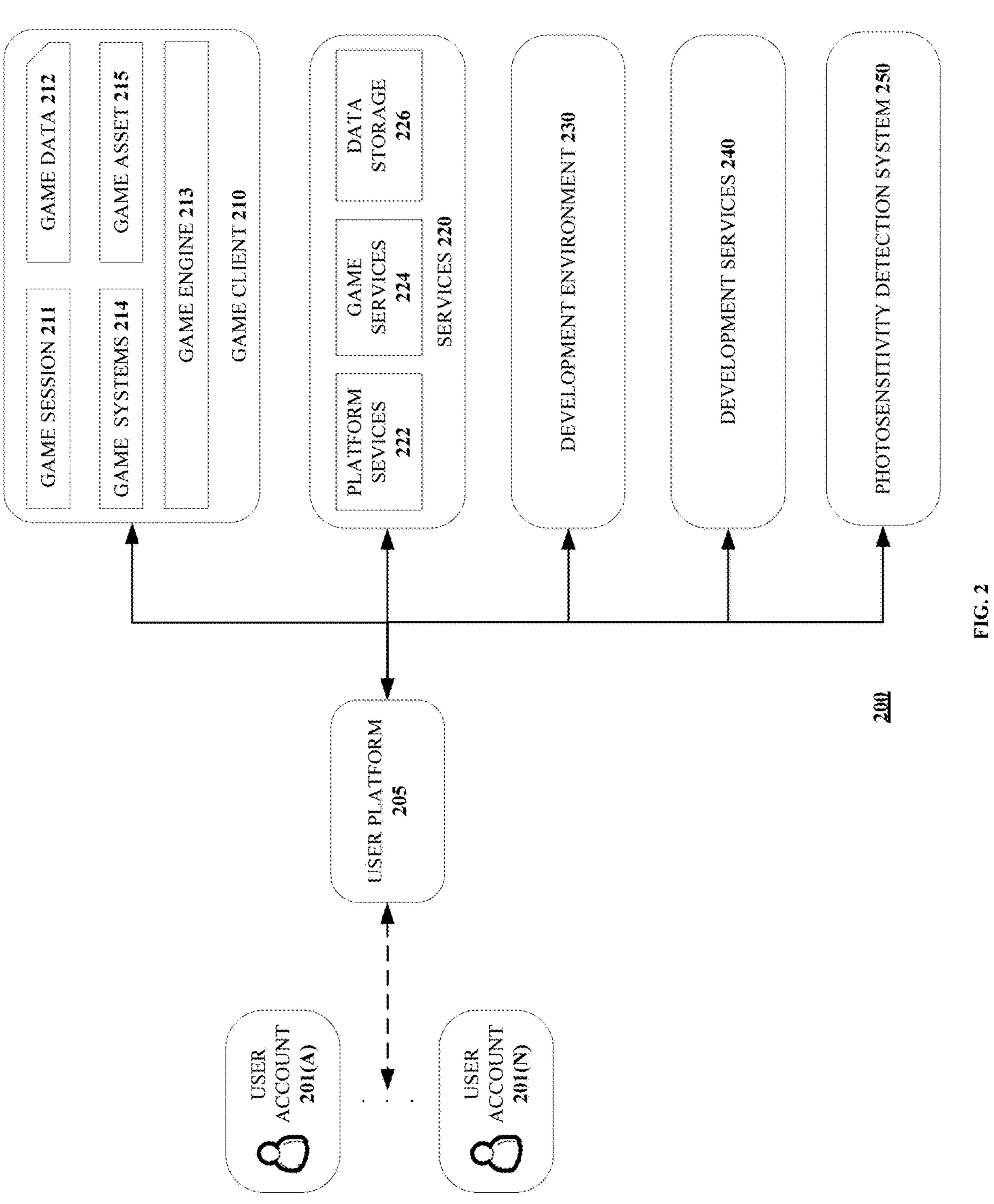
FIG. 2 illustrates a software environment, according to an example embodiment.

FIG. 2 illustrates an example embodiment of a software environment 200 to design, develop, test, and/or play a video game—or one or more aspects, features, and/or services thereof—among other things. Software environment 200 includes a number of software (i.e., computer executable instructions) distributed over—and/or executable on—one or more communicatively coupled hardware devices, similar to computing device 110 and server device 130 over network 120 of FIG. 1. In some embodiments, the software among software environment 200 is used to automate photosensitivity detection.

Software environment 200 includes user platform 205, game client 210, service 220, development environment 230, and development service 240. In some embodiments, the software among software environment 200 is configured with computer executable instructions to communicate data.

User platform 205 includes computer executable instructions configured to access and/or manage software and/or services associated with user platform 205, among other things; such as, for example, game clients 210, services 220, development environment 230, and/or development services 240.

In some embodiments, user platform 205 supports and/or requires a "users account" for accessing and/or managing software and/or services associated with user platform 205. As illustrated by way of example in the embodiment of FIG. 2, user account 201(A) through user account 201(N) are accounts of users (similar to users 105 of FIG. 1) that correspond to user platform 205; wherein "N" is arbitrary real value used to denote an "A through N" amount of user accounts (herein collectively referred to as "201"). In some embodiments, each user account 201 may locally execute and/or remotely access or communicate with one or more of the software and/or services among software environment 200 from or on one or more hardware devices.

In some embodiments, user accounts 201 include data provided by users, such as a username, which identifies a user account 201 (and in turn a user) among software environment 200. In some embodiments, data corresponding to and/or communicated among software environment 200 can be associated to and/or with user platform 205 and one or more user accounts 201. In some embodiments, data corresponding to user platform 205—and one or more user accounts 201—is associated to or with game clients 210, services 220, development environment 230, and/or development service 240, among other things.

Game client 210 is software including, comprising, and/or composing of a video game, or portion thereof. Game client 210 includes game client components (213, 214, and 215) and game data 212 that can be utilized to produce and/or maintain game session 211; or multiples thereof.

Game session 211 is an instance of one or more virtual interactive environments of game client 210. In some embodiments, a virtual interactive environment includes one or more virtual levels and/or graphical user interfaces providing an interactive virtual area or virtual space for gameplay and/or socializing. For example, game session 211 can be among a game level or social space, which may include one or more player characters, non-player characters, quests, objectives, and other features, elements, or aspects known in the art. The virtual interactive environment may have a topography and include one or more objects positioned within the topography that are capable of locomotion within the topography. In some instances, the topography may include a two-dimensional topography. In other instances, the topography may include a three-dimensional topography. In some embodiments, game session 211 is produced and/or maintained in part by game data 212, game engine 213, game systems 214, and game assets 215, among other things; such as, for example, user platform 205 and/or services 220.

As a non-limiting example, a first instance of a game session may be of a first version of a first virtual interactive environment, while a subsequent instance of a game session may be of a subsequent version of the first virtual interactive environment, such that there are one or more changes or differences among the first virtual interactive environment between the two instances of the game session.

Game session 211 may include a number of player characters and/or non-player characters. Player characters of game session 211 can refer to controllable character models configured to facilitate or perform gameplay actions or commands. In some embodiments, a user or player can control and/or direct one or more player characters in a virtual interactive environment of game session 211. The term "non-player character" corresponds to character models that are not controlled and/or directed by players (commonly known as "NPCs"). An NPC can be configured with computer executable instructions to perform one or more tasks and/or actions among the gameplay of game session 211 (i.e., gameplay actions); such as with and/or without interaction with or from a player character.

The game session 211 may include a number of player objects. Player objects of game session 211 can refer to controllable objects, or models, used to facilitate or enable gameplay or other in-game actions. Player objects may be, for example, vehicles, vessels, aircraft, ships, tiles, cards, dice, pawns, and other in-game items of the like known to those of skill in the art. In some embodiments, a user or player can control or direct one or more player objects in game session 211, including, in some instances, by controlling player characters which in turn causes the objects to be controlled.

For simplicity, player characters and player objects are collectively referred to herein as player characters in some embodiments. It should be understood that, as used herein, "controllable" refers to the characteristic of being able and/or configured to be controlled and/or directed (e.g., moved, modified, etc.) by a player or user through one or more input means, such as a controller or other input device, by a player or user. As known to a person of ordinary skill in the art, player characters include character models configured to receive input.

Game data 212 is data corresponding to one or more aspects of game client 210, such as gameplay. In some embodiments, game data 212 includes data such as state data, simulation data, rendering data, and other data types of the like.

State data is commonly known as data describing a state of a player character, virtual interactive environment, and/or other virtual objects, actors, or entities—in whole or in part—at one or more instances or periods of time during a game session of a video game. For example, state data can include the current location and condition of one or more player characters among a virtual interactive environment at a given time, frame, or duration of time or number of frames.

Simulation data is commonly known as the underlying data corresponding to simulation (i.e., physics and other corresponding mechanics) to drive the simulation of a model or object in a game engine. For example, simulation data can include the joint and structural configuration of a character model and corresponding physical forces or characteristics applied to it at instance or period of time during gameplay, such as a "frame", to create animations, among other things.

Render Data is commonly known as the underlying data corresponding to rendering (e.g., visual, and auditory rendering) aspects of a game session, which are rendered (e.g., for output to an output device) by a game engine. For example, render data can include data corresponding to the rendering of graphical, visual, auditory, and/or haptic output of a video game, among other things. During rendering, the luminance can be computed. The rendering process can be performed by various hardware and software components. For example, luminance can be computed on a CPU (single or multiple threads), using graphics hardware via interfaces such as OpenGL or DirectX, or using the GPGU approach like CUDA or JAX. In some embodiments, cloud computing can be utilized for parallelization.

In some embodiments, gameplay session 211 is based in part on game data 212. During game session 211 (e.g., runtime execution), one or more aspects of gameplay (e.g. rendering, simulation, state, gameplay actions of player characters) uses, produces, generates, and/or modifies game data 212 or portion thereof. Likewise, gameplay events, objectives, triggers, and other aspects, objects, or elements of the like also use, produce, generate, and/or modify game data 212, or a portion thereof. In some embodiments, game data 212 includes data produced or generated over the course of a number of game sessions associated with one or more game clients 210. Game data 212 may be updated, versioned, and/or stored periodically as a number of files to a memory device associated with game client 210, or remotely on a memory device associated with a game server or game service, such as data storage 226. Additionally, game data 212, or copies and/or portions thereof, can be stored, referenced, categorized, or placed into a number of buffers or storage buffers. A buffer can be configured to capture particular data, or data types, of game data 212 for processing and/or storage. These buffers can be used by game client 210, service 220, user platform 205, development environment 230, and/or development services 240 for performing one or more tasks.

Game client components (e.g., game engine 213, game systems 214, and game assets 215) are portions or subparts of game client 210 that provide the underlying frameworks and software that support and facilitate features corresponding to gameplay, such as instancing game sessions that connect one or more user accounts for gameplay among a virtual interactive environment.

Game engine 213 is a software framework configured with computer executable instructions to execute computer executable instructions corresponding to a video game (e.g., game code). In some embodiments, game engine 213 is a distributable computer executable runtime portion of development environment 230. In some embodiments, game engine 213 and development environment 230 are game code agnostic.

In some embodiments, game engine 213 includes, among other things, a renderer, simulator, and stream layer. In some embodiments, game engine 213 uses game data (e.g., state data, render data, simulation data, audio data, and other data types of the like) to generate and/or render one or more outputs (e.g., visual output, audio output, and haptic output) for one or more hardware devices.

As used herein in some embodiments, a renderer is a graphics framework that manages the production of graphics corresponding to lighting, shadows, textures, user interfaces, and other effects or game assets of the like. As used herein in some embodiments, a simulator refers to a framework that manages simulation aspects corresponding to physics and other corresponding mechanics used in part for animations and/or interactions of gameplay objects, entities, characters, lighting, gasses, and other game assets or effects of the like.

As used herein in some embodiments, a stream layer is a software layer that allows a renderer and simulator to execute independently of one another by providing a common execution stream for renderings and simulations to be produced and/or synchronized (i.e., scheduled) at and/or during runtime. For example, a renderer and simulator of game engine 213 may execute at different rates (e.g., ticks, clocks) and have their respective outputs synchronized accordingly by a stream layer.

As used herein in some embodiments, game engine 213 also includes an audio engine or audio renderer that produces and synchronizes audio playback with or among the common execution of a stream layer. In some embodiments, an audio engine of game engine 213 can use game data to produce audio output and/or haptic output from game data. In some embodiments, an audio engine of game engine 213 can transcribe audio data or text data to produce audio haptic output.

Game systems 214 includes software configured with computer executable instructions that provide, facilitate, and manage gameplay features and gameplay aspects of game client 210. In some embodiments, game systems 214 includes the underlying framework and logic corresponding to gameplay of game client 210. For simplicity, game systems 214 are the "game code" that compose a video game of game client 210. As such, game systems 214 are used in part to produce, generate, and maintain gameplay among an instance of a virtual interactive environment, such as the gameplay among game session 211.

As used herein in some embodiments, game engine 213 and/or game systems 214 can also use and/or include Software Development Kits (SDKs), Application Program Interfaces (APIs), Dynamically Linked Libraries (DLLs), and other software libraries, components, modules, shims, or plugins that provide and/or enable a variety of functionality to game client 210; such as—but not limited to—graphics, audio, font, or communication support, establishing and maintaining service connections, performing authorizations, and providing anti-cheat and anti-fraud monitoring and detection, among other things.

Game assets 215 are digital assets that correspond to game client 210. In some embodiments, the game assets 215 can include virtual objects, character models, actors, entities, geometric meshes, textures, terrain maps, animation files, audio files, digital media files, font libraries, visual effects, and other digital assets commonly used in video games of the like. As such, game assets 215 are the data files used in part to produce the runtime of game client 210, such as the virtual interactive environments and menus. In some embodiments, game engine 213 and/or game systems 214 reference game assets 215 to produce game session 211.

In some embodiments, game client 210 can be played and/or executed on one or more hardware devices, such as computing devices 110 and server devices 130 of FIG. 1. In some embodiments, there are a number of game clients 210 that may include variations among one another: such as including different software instructions, components, graphical configurations, and/or data for supporting runtime execution among different hardware devices.

For example, multiple game clients 210 can be of the same video game wherein one game client 210 includes variations for support on a video game console (such as computing device 110(A) in FIG. 1), while another game client 210 includes variations for support on a mobile device (such as computing device 110(B) in FIG. 1). However, since the game clients are of the same video game, both game clients can connect to the same instance of a game session (such as game session 211) to enable user accounts 201 of user platform 205 to interact with one another by being communicatively coupled; such as by hardware devices running and/or accessing a game client 210 in communication with services 220.

Service 220 are software services including computer executable instructions configured to provide a number of services to user platform 205 and/or game client 210. As illustrated by way of example in FIG. 2, services 220 includes, but is not limited to, platform services 222, gameplay services 224, and data storage 226. In some embodiments, services 222 includes computer executable instructions configured and/or provided by development environment 230 and/or development services 240.

Platform services 222 includes computer executable instructions configured to provide anti-fraud detection, software management, user account validation, issue reporting, and other services corresponding to user platform 205 of the like.

Gameplay services 224 includes computer executable instructions configured to provide matchmaking services, game state management, anti-fraud detection, economy management, player account validation, and other services corresponding to gameplay of the like to game clients 210.

In some embodiments, platform services 222 and/or gameplay services 224 establish and maintain connections that, at least in part, facilitate gameplay in a game session of game client 210, such that game session 211 of game client 210 connects one or more users accounts 201 of user platform 205 for multiplayer gameplay and/or multi-user interaction among an instance of a virtual interactive environment.

Data storage 226 provides data storage management services to the software among software environment 200. In some embodiments, data communicated by and/or corresponding to elements 205, 201, 210, 220, 230, 240 and 250 may be stored, versioned, and/or managed—as one or more files—to and/or by data storage 226 or one or more hardware devices corresponding to software environment 200.

In some embodiments, Game clients 210 and user platform 205 can communicate with service 220 over a network, such as network 120 illustrated in FIG. 1. In some embodiments, service 220 is provided by server devices 130 of FIG. 1. In some embodiments, game client 210 and/or user platform 205 can require a user account 201 to access one or more features of game client 210; such as social gaming features including multiplayer game sessions or player to player communications. Respectively, data, such as game data 212 corresponding to one or more game sessions of game client 210 can be associated to user accounts 201 in some embodiments.

Development Environment 230 is software enabling the development or maintenance of one or more aspects, features, tools, and/or services corresponding to one or more of the software among software environment 200. In some embodiments, development environment 230 is a collection of tools, frameworks, services, and other computer executable instructions and applications of the like, such as, for example, a video game development engine. In some embodiments, development environment 230 can utilize external software—such as components, modules, libraries, plugins, and other systems of the like—to extend or expand functionality and/or capabilities.

Development Services 240 are software services including computer executable instructions configured to provide services corresponding to user platform 205, game client 210, services 220 and/or development environment 230. In some embodiments, development services 240 provide services similar to functionality and capabilities of development environment 230, thereby allowing and/or enabling development for software corresponding to, and/or aspects of, software environment 200. In some embodiments, development services 240 provide services to mock and/or simulate one or more components, services, or aspects of user platform 205, game client 210, and/or services 220, thereby allowing and/or enabling testing and/or validation, among other things, for one or more aspects corresponding to software environment 200.

Photosensitivity Detection System

PDS 250 is software including computer executable instructions configured to automate photosensitivity detection in virtual media and/or virtual interactive environments. The PDS can analyze flashes and patterns that could be potentially harmful within video data. Such potential harms can be based in whole or in part on established photosensitivity guidelines, such as ITU-R, Ofcom, and WCAG. The PDS can be configured to analyze videos based on different criteria, such as different standards from different jurisdictions. The PDS is configured to analyze the video data to run a compliance check for photosensitivity. The video data includes a plurality of frames. In some instances, the video data may be in the form of a file with a discreet file size having a defined video length. In some instances, the video data may be collected during runtime an application, such as a video game, which can continuously generate frames. The video data may be stored in a video buffer, such as a ring buffer. In such an instance, the PDS may continually analyze the video data during runtime. In such an embodiment, optionally, the PDS may scale the frame to allow for faster processing of the video data. The scaling can be performed to reduce processing load and account for a limited processing budget during runtime of the application. For example, each frame of the video data may be down scaled to a defined resolution.

Figure 3:
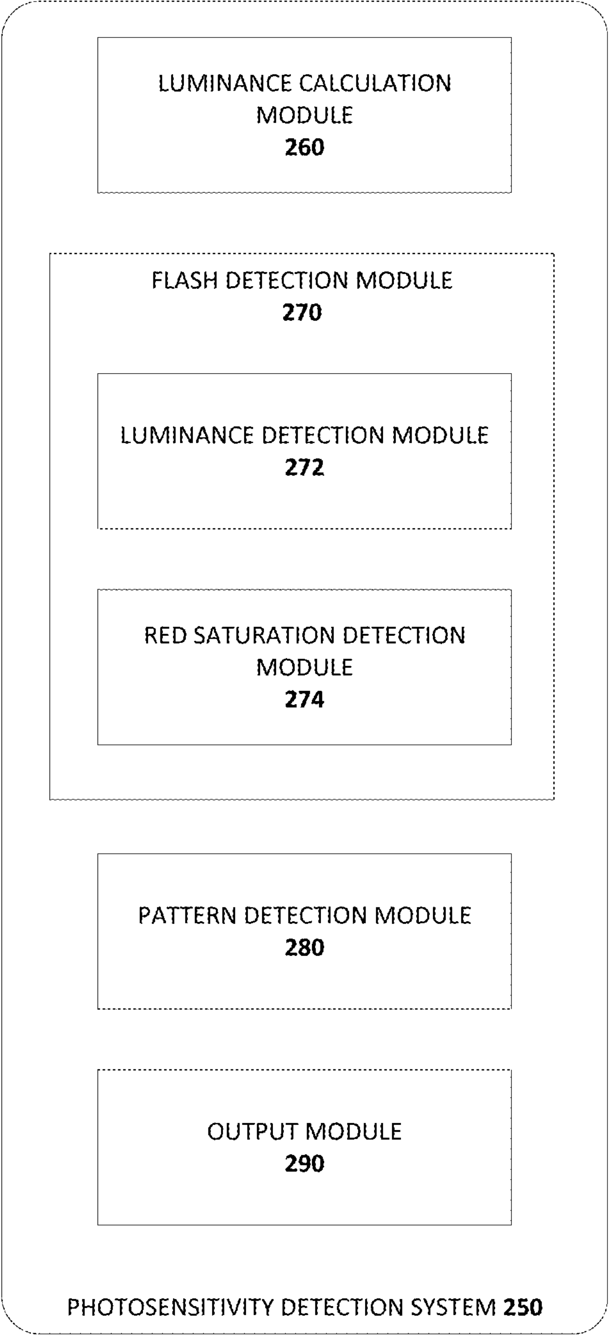
FIG. 3 illustrates an example embodiment of a PDS.

The photosensitivity detection system (PDS) 250 is described with further reference to FIG. 3. PDS 250 includes one or more software modules, including a luminance calculation module 260, flash detection module 270, pattern detection module 280, and an output module 290, configured to perform one or more tasks associated with photosensitivity detection.

Luminance calculation module 260 is configured to calculate luminance for each frame of a video. Luminance is the objective measurement of brightness. Brightness can be considered a subjective measurement of light. It is the perception of each individual to the amount of light emitted by an object. Luminance (Y) provides the photometric measure of the luminous intensity per unit area of light travelling in a given direction and can be measured in candelas per square meter (cd/m2).

The luminance calculation module 260 can be configured to receive a video frame in RGB and convert the RGB values into luminance values. Luminance can be calculated for each frame in the video, and each pixel that is part of the frame can have its own luminance value. The conversion can be done by applying a formula to the color space values in every pixel. As a frame is essentially a pixel matrix, where the pixel information varies depending on the color space of the image, hence the pixel values can be used for the conversion. A frame can also be referred to as a matrix.

Relative luminance can be used to calculate normalized luminance values which are calculated from linear components. The relative luminance method can be used as it does not require knowledge of the encoding standard in a video. Relative luminance can also be referred to as digital luminance. RGB, the frame's default color space, is non-linear and suffers from gamma correction. As a result, the first step can be to convert the color space to the linear sRGB color space.

Once the frame has been converted to sRGB, formula (1) can be applied to obtain the luminance values where R, G and B are the different color components from the sRGB color space. The resulting values range from 0 to 1.

$$Y = 0.2126 * R + 0.7152 * G + 0.0722 * B \tag{1}$$

The black color having the lowest value of 0 and the white color having the highest value of 1. The threshold value for a relative luminance change can be a defined increment, such as 0.1.

Flash Detection Module 270 is configured to detect transitions in luminance or red saturation. The luminance detection module 272 is configured to detect luminance flashes and the red saturation module 274 is configured to detect red saturation flashes during the video. The flash detection process cannot be obtained from individual frames. Rather, the transitions occur over a plurality of frames. To properly detect transitions, and analyze videos for flash detection, the variation changes are evaluated with respect to thresholds, which can happen over a defined time period.

A potentially harmful flash occurs when there is a pair of opposing changes in luminance (e.g., an increase in luminance followed by a decrease, or a decrease followed by an increase) of a defined change, such as 20 candelas per square meter (cd/m2) or more. This can apply when the screen luminance of the darker image is below a darkness threshold, such as 160 cd/m2. In addition to a luminance flash, a transition to or from a saturated red can also be potentially harmful.

Isolated single, double, or triple flashes can be acceptable, but a sequence of flashes is not permitted when both the following occur: (1) the combined area of flashes occurring concurrently occupies more than a threshold area (such as 25%) of the displayed screen area; and (2) more than a defined number of flashes (such as three flashes) occurs within any defined time period (such as one second), frames or more are acceptable, irrespective of their brightness or screen area. Rapidly changing image sequences (e.g., fast cuts) can result in areas of the screen that flash, in which case the same constraints apply as for flashes.

In accordance with an example flash compliance criteria, videos fail to comply to the criteria when: there are more than 3 luminance flashes (6 transitions) per second or there are more than 3 red saturation flashes (6 transitions) per second; there is luminance flashing between 2 and 3 flashes (4, 6 transitions) for over 4 seconds of the video (Luminance Extended Flash Failure); or there is red saturation flashing between 2 and 3 flashes (4, 6 transitions) for over 4 seconds of the video (Red Extended Flash Failure).

The PDS validates flashes in videos by detecting flash transitions and tracking them. Generally, the following criteria is met for a transition to occur: (1) a minimum flash value threshold has to be reached, and (2) a minimum threshold area of the video frame must have changed. For transitions to violate compliance criteria and part of a flash, not only does the flash transition value need to reach a certain threshold, but also the flash area threshold.

As a result, flash variation values can be accumulated frame by frame. If the accumulated difference reach a threshold, and the area of the frame is at or above a flash area threshold, a transition will have occurred. The transitions can be counted over a defined period of time. The transition count can be used to determine whether the number of transitions within the defined time period exceeds a failure threshold for any compliance criteria.

Even though the failure criteria can be similar, luminance flashes and red saturation flashes are two different flashes that constitute two different flash failures. The difference of these types of flashes is based on their flash values, how each value is calculated, the value range and the flash threshold value. Otherwise, the analysis follows the same general process. The specifics of the flash detection processes are further described herein.

Pattern detection module 280 is configured to detect multiple variations to geometric patterns. Patterns can be reduced to sets of lines, straight or curved, that are composed of similar discernible stripes with similar luminance values and that occupy a certain area of the screen display. Patterns that are potentially harmful are those that have more than a defined number of repeating elements (e.g., 5 pairs of stripes), occupy a threshold area of the frames (e.g., 25% or more of the screen display), and have at least a threshold luminance difference in relative luminance between the lighter and darker portions (e.g., 0.1 difference). In other words, the patterns are regular, periodic and have clear contrast between the components that compose them. If detected patterns exceed defined pattern thresholds, then the pattern is considered potentially harmful. Throughout the video, the count of pattern frames that are potentially in violation of compliance criteria is tracked. If the same pattern is present in the frames for a defined duration (e.g., 0.5 seconds), frames that exceed the duration are considered in violation of the compliance criteria and the video fails the analysis. The specifics of the pattern detection processes are further described herein.

Output module 290 is configured to generate result reports based on outputs of the flash detection module 270 and pattern detection module 280. The result reports can provide an indication whether the analyzed video passed for failed each test. The output module can be configured to collect and store data generated by the video analysis. The result reports can help users understand the analysis of a video, which can include information for each frame of the video. With this data, the output module 290 can generate graphs that can plot the data and provide a graphical representation to better understand the results of the tests. The result can quantify the data for flashes and patterns to easily indicate which sections of the video have failed or passed. Some non-limiting examples of result reports and graphs are illustrated in FIGS. 8A-8B, 13, and 15.

The software modules illustrated in FIG. 3 are provided by way of example, not limitation, to illustrate one embodiment of steps that correspond to the functionality of PDS 250.

PDS Process

Figure 4B:
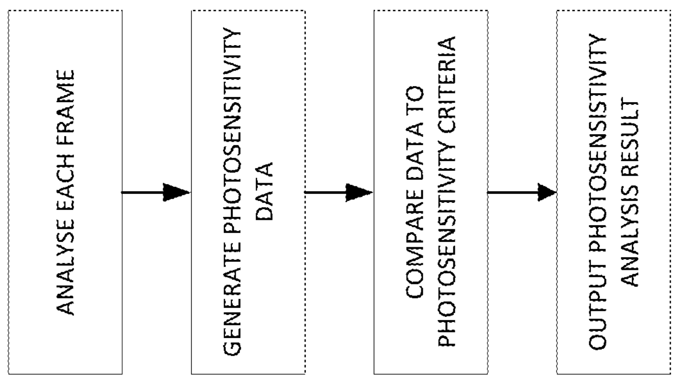
FIGS. 4A and 4B illustrate an embodiment of the general processes for flash detection and pattern detection of a video.
Figure 4A:
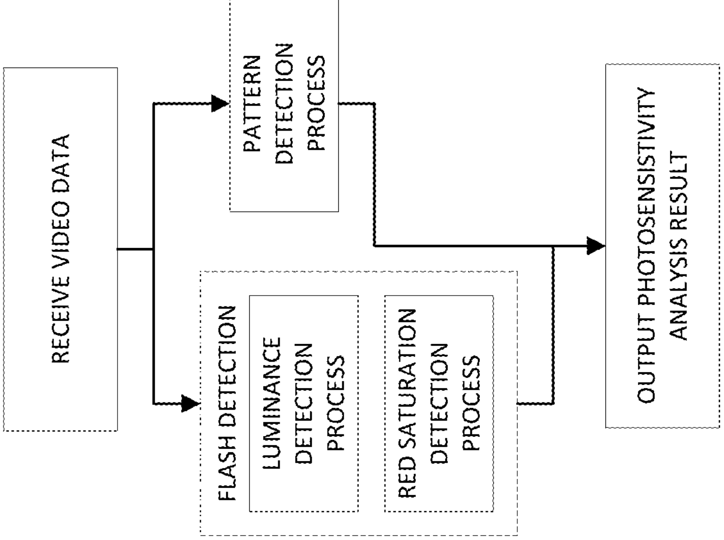

FIGS. 4A and 4B illustrates an example embodiment of a block diagram illustrating the overview of the general process associated with an PDS for flash detection and pattern detection of a video. FIG. 4A illustrates the process that the PDS executes to output an analysis result for each type of photosensitivity detection analysis for a video. The PDS can execute each type of photosensitivity detection analysis independently of the other photosensitivity detection processes. Each photosensitivity detection process is a distinct process that can be calculated without reference to the other processes. The final analysis result can aggregate the results of each detection process executed by the PDS. Each type of photosensitivity detection needs to pass the analysis for the video to pass. In other words, if any of the photosensitivity detection processes generate a fail result, the video fails.

Execution of each of the detection processes follows the same general algorithm illustrated in FIG. 4B. Each frame of the video data is analyzed according the specifics of the type of photosensitivity detection process. Based on the analysis, the PDS generates corresponding photosensitivity data. The photosensitivity data is compared to corresponding photosensitivity criteria for determining whether the video passes. A photosensitivity analysis result is generated. The photosensitivity analysis result can aggregate and output the results of all of the executed processes. For example, the output can be a CSV file that provides the results of each analysis in a single document. For purposes of the photosensitivity analysis, if the luminance, red saturation, or pattern analysis fails the criteria, the video fails the photosensitivity analysis. The details of each analysis process will be further described below. The flash detection processes of luminance and red saturation are further described further with respect to FIGS. 5A-9. The pattern detection process is described further with respect to FIGS. 10A-14.

Flash Detection: Luminance Transitions

Figures 5A, 5B, 5C:
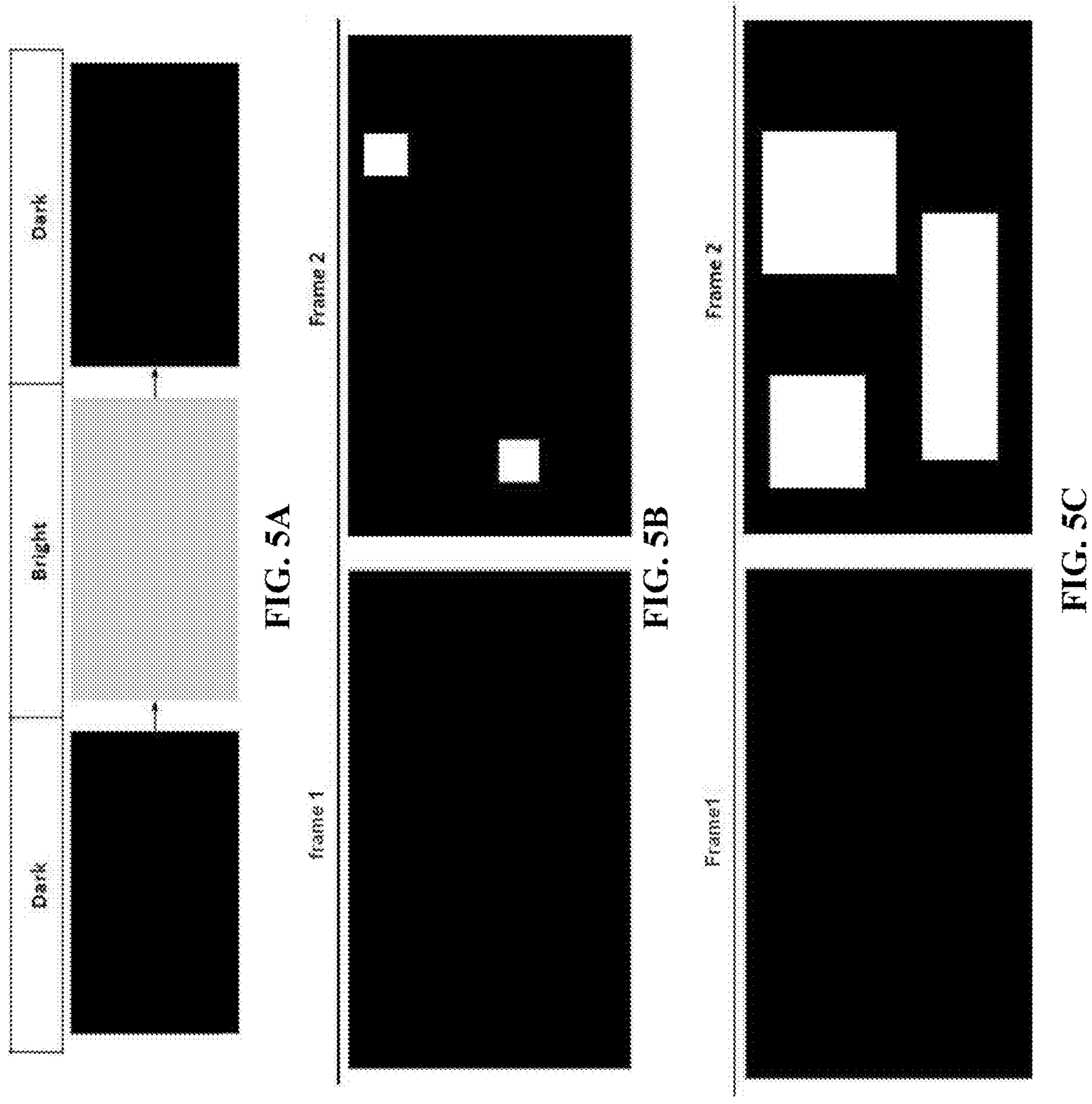
FIGS. 5A-5C illustrate schematic representations of luminance transitions.

FIGS. 5A-5C illustrate schematic representations of luminance transitions. A luminance transition occurs when there is (1) a change in luminance that satisfies the luminance flash threshold, and (2) the area of the change satisfies luminance area threshold. For luminance flash detection, a luminance value can be calculated for each pixel within a frame.

The change in luminance occurs when there is an increase and a decrease (or vice versa) in brightness, as illustrated in FIG. 5A. The frame transitions from dark to bright and then back to dark again. The PDS can use relative luminance for the luminance calculation. It ranges from 0 to 1, the black color having the lowest values of 0 and the white color having the highest value of 1. There can be a luminance flash threshold for determining whether a transition has occurred from dark to bright, or vice versa. For example, the luminance flash threshold can be 0.1, meaning that if the luminance changes by at least 0.1 between frames, the luminance transition threshold is satisfied. In the case of luminance, in some instances, a darkness threshold is used, where if at or above the darkness threshold, any increase above the darkness threshold would not satisfy the luminance flash threshold. Such a change would not be considered a potentially harmful transition.

The frame variation can be used to determine the difference between frame (n) and frame (n−1). The frame variation can be used for area checking. The frame variation is the amount of change between consecutive frames. With the difference values of each flash type, it is possible to check for the variation area. The luminance area threshold can be equal to a percentage of total pixels in a frame, such as, for example 25%.

The flash area can be calculated by subtracting consecutive frames and obtaining the number of pixels that have varied in value between both frames. This can be calculated by subtracting one frame and the frame before (e.g., frame 2–frame 1). The subtraction can be done using the luminance values calculated from the RGB values.

$$frameAreaDiff = \text{frame}_n - \text{frame}_{n-1} \quad (2)$$

When the PDS detects transitions, it first checks the size of the area that has changed between each pair of consecutive frames. The variation between frames is the number of pixels that have changed from one frame to the next. The number of pixels in the luminance area threshold can be calculated as described in equation (3).

$$\text{areaThresholdpixels} = nRows * nColumns * \text{threshold percentage} \quad (3)$$

If the pixel count is equal or higher than the luminance area threshold, then a flash trend can be set, otherwise it is considered that there has been no variation. In the example illustrated in FIG. 6B, when subtracting Frame 2 and Frame 1, the obtained percentage of pixels that are different (the white squares) is less than the luminance area threshold. For example, the luminance area threshold may be 25% and the number of pixels that changed in frame 2 of FIG. 6B, does not satisfy this threshold. Thus, there is no luminance transition between frames as the number of pixels that changed is less than 25% of the entire frame area, even though the luminance flash threshold has been satisfied.

In the example illustrated in 5C, where the luminance area threshold has been satisfied. In this example, a luminance transition between frames is triggered. It is a transition because the luminance area threshold has been surpassed and the luminance threshold has been surpassed. The white rectangles from frame 2 have a luminance of 1, and were not present in frame 1, so the luminance change value is 1. In some embodiments, if the difference between two consecutive frames is below the luminance area threshold, the luminance difference value between both frames would not be calculated.

The luminance difference value cannot be calculated by simply subtracting consecutive frames because video frames are composed of a high amount of different colored pixels, which means different luminance values for each pixel. To account for this, an average luminance of each frame can be calculated and then subtracted. This allows the PDS to obtain an average luminance difference value between frames, which can be used to detect transitions. Generally, transitions won't take place from one frame to the next, but will elapse over multiple frames. To account for this, average differences are accumulated over time and compared to the luminance flash threshold.

The PDS can detect a luminance transition as follows. First, a frame is converted from RGB pixel values to relative luminance. Then, the difference between both frames is calculated to obtain the area variation percentage. If the changed area is equal or greater than luminance area threshold, then a luminance difference value is also calculated, if not it can be disregarded, such as setting the value to zero. The luminance difference value is calculated by average luminance of the frames are again subtracted to obtain the flash value of this possible transition. The calculated luminance difference value is compared to luminance flash threshold. If luminance difference value is equal or greater than the luminance flash threshold a transition is detected, as both the luminance area threshold and luminance flash threshold have been surpassed.

Figure 6A:
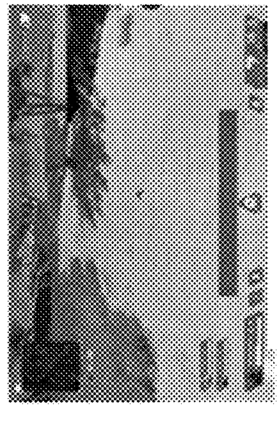
FIG. 6A illustrates a frame sequence of gameplay footage of a video game in grayscale.
Figure 6A:
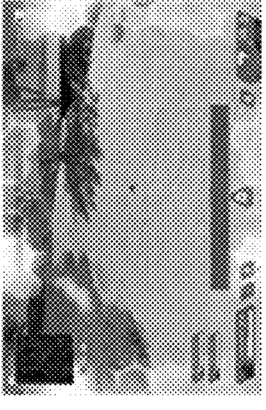
Figure 6A:
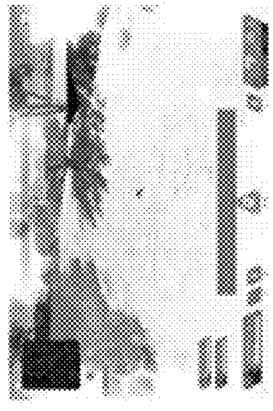
Figure 6A:
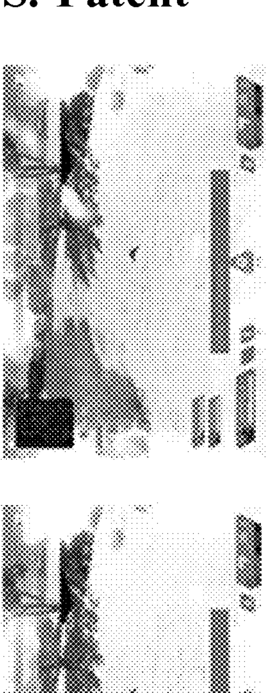
Figure 6A:
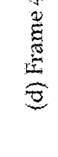
Figure 6B:
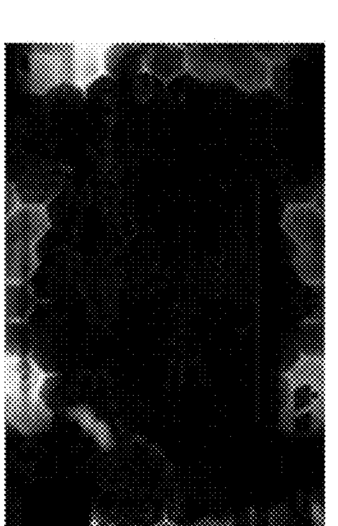
Figure 6B:
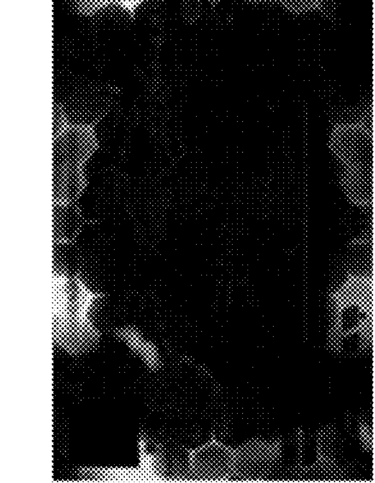
Figure 6B:
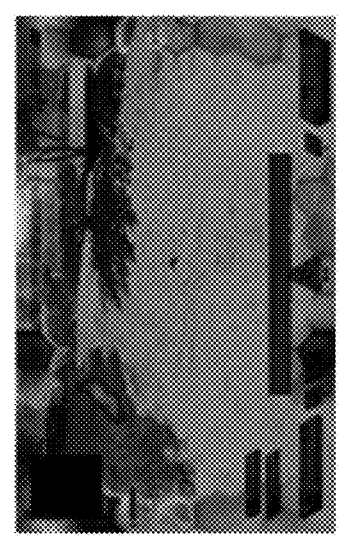
Figure 6B:
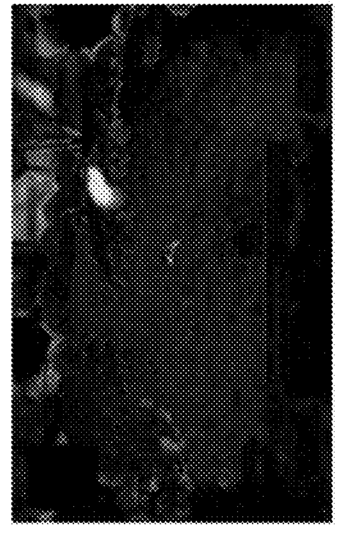

FIGS. 6A and 6B illustrate examples of luminance calculations within video frames from a videogame. FIG. 6A illustrates a frame sequence of gameplay footage of a video game in grayscale. The process can apply subtraction between frames using equation (1). The result can be observed in the images from FIG. 6E. The images are displayed as the absolute luminance frame difference, as negative values cannot be displayed in images.

In FIG. 6B the non-black pixels indicate which pixels have varied in values from frame to frame. After obtaining the frame variation, obtaining the amount of pixels that have varied can be calculated by counting all the non-zero pixels from the frame difference matrix. The total non-zero count corresponds to the total variation pixel count, which is compared to the luminance area threshold.

Red Saturation Transitions

Figures 7A, 7B, 7C:
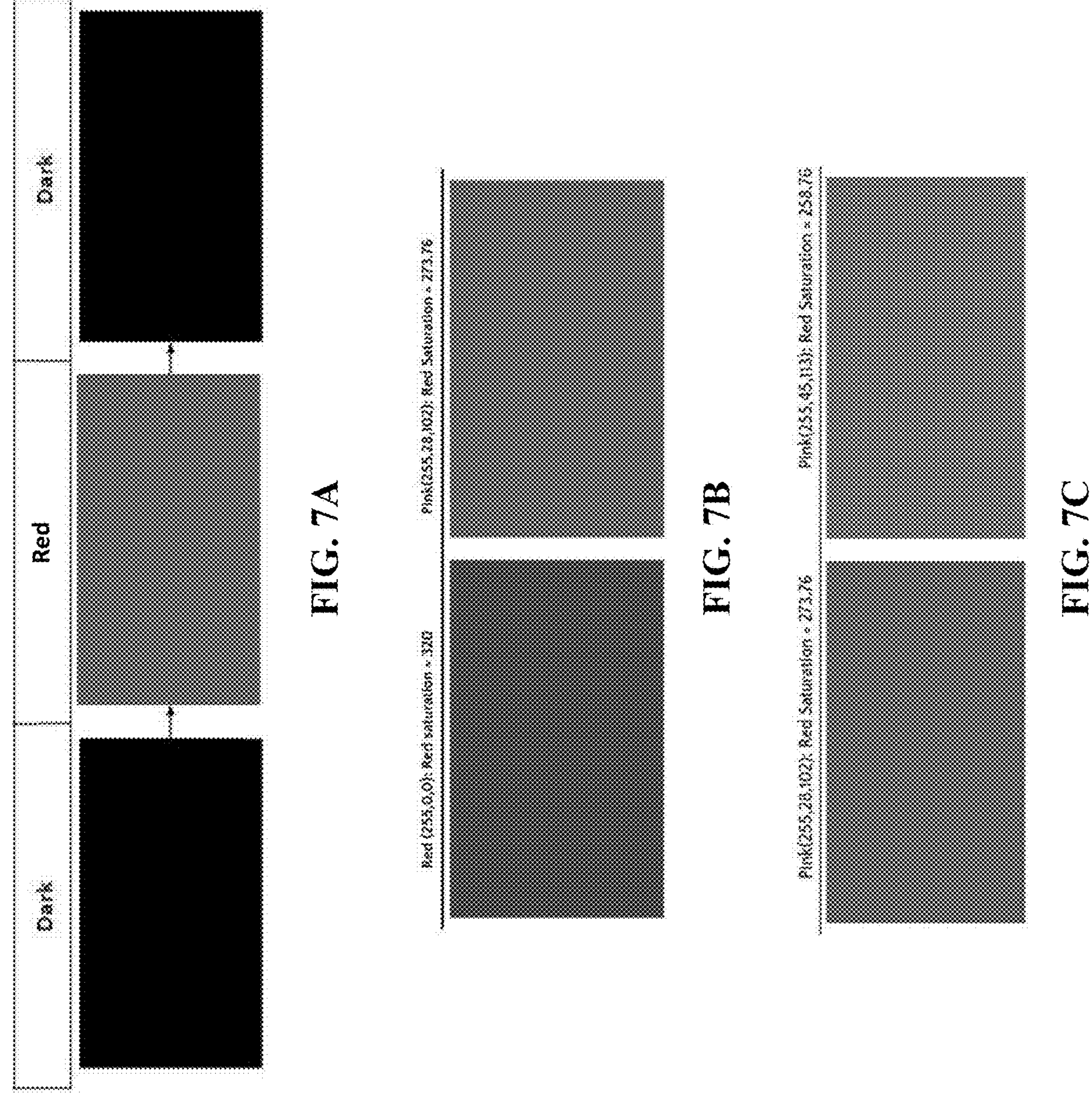
FIGS. 7A-7C illustrate schematic representations of red saturation transitions.
Figure 7D:
FIGS. 7D and 7E illustrate examples of red saturation calculations within video frames from a videogame.
Figure 7D:
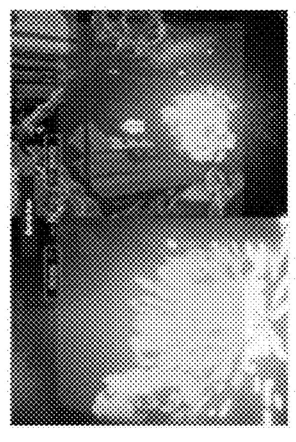
Figure 7E:
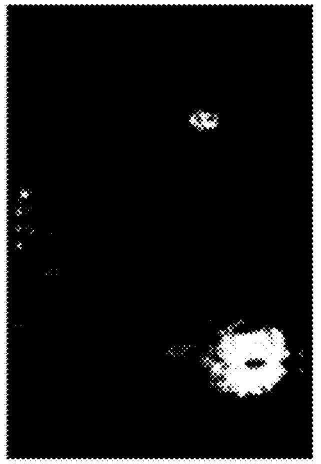
Figure 7E:
Figure 7E:
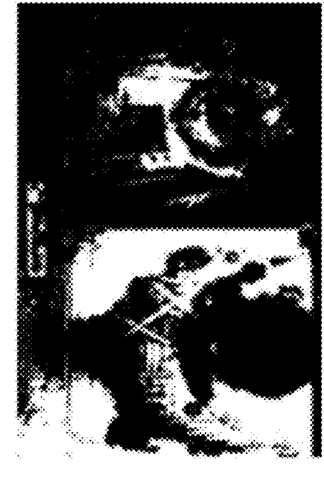

FIGS. 7A, 7B, and 7C illustrate schematic representations of red saturation transitions. FIGS. 7D and 7E illustrate examples of red saturation calculations within video frames from a videogame. Red saturation transitions follow the same procedure for detection as luminance transitions. These transitions are detected by determining if a color is saturated red or not, then tracking the changes in red saturation. The changes in red saturation range from 0 to 320. Transitions occur when there has been a change that satisfies a red saturation flash threshold, such as, for example a change of 20 in red saturation, and the red saturation area threshold has been reached or surpassed. The red saturation flash threshold and the luminance flash threshold are different thresholds and use different units. The red saturation area threshold and the luminance area threshold both represent a portion of the frame. The area thresholds for red saturation and luminance can be the same or different.

The red saturation matrix is also calculated with the frame in the sRGB color space. When it comes to color theory, saturation is the range from pure color to gray. Saturation is sometimes referred to as color intensity or chroma. The red saturation value for the video frame is calculated. The video frame can be converted from the RGB color space to sRGB (a linear color space that ranges from 0 to 1). Then the red saturation value can be calculated using the following equation:

$$R/(R+G+B) >= 0.8 \quad (4)$$

Equation (4) is the mathematical definition for saturated red where R, G and B are the color components from sRGB. Whenever a pixel meets this condition, the pixel is considered to be saturated red. When the red saturation value of equation (4) is greater than or equal to 0.8 the pixel is red saturated. Equation (5) is used to determine the minimum needed value of change for a red saturation transition to take place.

$$(R-G-B) * 320 >= \text{Flash Threshold} \quad (5)$$

Using the equations (4) and (5) the frame can be converted. The non-saturated red colors are set to zero and the red saturated colors are set to their saturation value.

FIGS. 7B and 7C illustrate calculations of the red saturation and comparison to the red saturation flash threshold.

In the examples, the red saturation flash threshold is set at 20. FIG. 7B illustrates two red saturated colors are red colors. Certain pink colors can be considered red saturated due to the high presence of red that composes the color. The red color has a red saturation of 320 and the pink color has a red saturation of 273.76. the subtraction results in 46.24 which is higher than the threshold value that equals to 20. This could be a transition as the red saturation flash threshold has been surpassed. If the total variation pixel count is equal or higher than the red saturation area threshold, then the flash trend has to be set, otherwise it is considered that there has been no variation. FIG. 7C illustrates two pink colors having values of 273.76 and 258.76, the resulting difference is 15, this would not be a transition because the red saturation flash threshold has not been reached. Note that examples in FIG. 7C use red saturated colors, but red saturation flashes are defined as changes from, or to, red saturation (which means 2 opposing changes, 2 transitions). This means that the transitions can happen between a red saturated color and a non-red saturated color. The non-red saturated colors will have a zero value for red saturation.

The flash area calculation for red saturation works in the same way as for luminance transitions, as well as the average red saturation difference between frames as described above.

The PDS can detect a red saturation transition as follows. First, a frame is converted from RGB pixel values to red saturation values. Then, the difference between both frames is calculated to obtain the area variation percentage. If the changed area is equal or greater than red saturation area threshold, then a red saturation difference value is also calculated, if not it can be disregarded, such as setting the value to zero. The red saturation difference value is calculated by average red saturation of the frames are again subtracted to obtain the flash value of this possible transition. The calculated red saturation difference value is compared to red saturation flash threshold. If red saturation difference value is equal or greater than the red saturation flash threshold a transition is detected, as both the red saturation area threshold and red saturation flash threshold have been surpassed.

FIG. 7D illustrates a frame sequence of gameplay footage of a video game. The process of applying subtraction using equation (1) to the red saturation frames. The result can be observed in the images from FIG. 7E. The images are displayed as the absolute red saturation frame difference, as negative values cannot be displayed in images. In FIG. 7E the non-black pixels indicate which pixels have varied in values from frame to frame. After obtaining the frame variation, obtaining the amount of pixels that have varied can be calculated by counting all the non-zero pixels from the frame difference matrix. The total non-zero count corresponds to the total variation pixel count, which is compared to the red saturation area threshold.

Flash Trend/Frame Mean Difference

The PDS can determine a flash trend for frames. The flash trend can be determined by computing the frame mean difference. The difference in the frame mean sets the flash trend when there has been enough variation between frames. The mean allows tracking the overall changes in the flash values between frames.

Using equation (6) the mean frame difference is obtained, for both types of flashes, and can now be used to track transitions by flash trend to check the flash value threshold.

$$\textit{frameMeanDiff} = \text{frameMean}_n - \text{frameMean}_{n-1} \tag{6}$$

It is expected to have increases and decreases in luminance and red saturation throughout a video. These changes are not flagged as flash transitions unless they reach a flash value threshold and a flash area threshold. If the thresholds are not satisfied, the change is not part of a flash transition. The flash threshold for relative luminance is 0.1 and for red saturation it's 20. To determine if a transition has reached the threshold, the variation trend is needed to properly accumulate and check the accumulated variation values. The trend is obtained from the difference of the mean of each pair of consecutive frames. The trend can be positive (increase of the flash values), negative (decrease of the flash values), or null (no variation of the flash values).

When there is no change between frames, it means that the flash trend has not changed. The trend can be either incremental or in decline. As in most cases there will be some change in between frames, a null change occurs when the frame difference has not reached the area threshold. Due to the requirement to surpass the area threshold, the trend is only obtained when there has been enough change between frames. Flashes can be considered harmful when they surpass the flash threshold and the flash area threshold. In order to obtain the transition trend and accumulate the variation values, the frame difference is calculated to confirm there has been enough change in between frames to track the variation, if not, the trend is null and remains the same as if there had been no change.

Accumulation

The flash trend can be received as a value. Because flash variations can take place throughout multiple frames, the mean frame difference can be accumulated to detect changes between frame sequences. The increase or decrease of flash values can be gradual. The mean difference is accumulated if the flash trend remains the same or if there has been no variation among consecutive frames. Otherwise, the flash accumulation is reset to the new mean difference value.

A video is composed of multiple frames and each second of the video is composed by a set of frames, which is defined by the video's frames per second (FPS). In a 60 FPS video, the PDS needs to track the flash values for luminance and red saturation throughout 60 frames to ensure that all transitions are being detected. Because a transition can also occur through multiple frames. In order to track gradual changes and non-gradual changes (e.g., a gradual increase or decrease in brightness), the difference of the average luminance and red saturation is accumulated frame by frame.

Transitions represent the increase or decrease of the opposing changes of a flash. This is why both the luminance and red difference can have positive and negative values. If it's positive there's been an increase and if it's negative there's been a decrease. This is important because it means that the average flash difference cannot just be summed one after the other when new values are obtained. The values need to be accumulated by sign.

A transition can occur when conditions (7) and (8) are true, which is when the flash tendency remains the same. Or, when condition (9) is true and thus the flash tendency has changed. These conditions prevent counting transitions multiple times that take place through several frames; thus, this step returns a Boolean that is only true if a new transition has occurred.

Transition Conditions:

$$(meanDiff\ Acc <= 0 \&\& lastMeanDiff\ Acc <= 0) \quad (7)$$

$$\|(meanDiff\ Acc >= 0 \&\& lastMeanDiff\ Acc >= 0)$$

$$[lastMeanDiff\ Acc] >= \text{Threshold} \quad (8)$$

$$[meanDiff\ Acc] >= \text{Threshold} \quad (9)$$

In an illustrative example, a video that has been captured at 25 fps is being analyzed. The first average luminance difference (frame 1) value is positive. Frame 0's average luminance difference accumulated will be zero as frame 0 is the base value (for both luminance and red saturation). Because that first value is zero and the new one is positive, the value will be accumulated. The next three frames all have positive or 0 values (a 0 value means there was not enough variation between frames), these have all been accumulated and the sum of all the frames is 0.07 in relative luminance. So far, the luminance threshold (0.1) has not been reached. For now, only an increase in luminance is taking place.

Then, frame 5 has a negative value. This means that now a decrease in luminance is occurring. The accumulated values up to this point are discarded and the average luminance difference of frame 5 is the new average luminance difference accumulated value as a new transition tendency is taking place. Frames 6 and 7 also have negative average luminance values, so these are accumulated too. When accumulating frame 6, the average luminance difference accumulated value is –0.08, no new transition has occurred. When accumulating frame 7, the average luminance difference accumulated is –0.23, which is higher than the –0.1 threshold. A new transition has occurred. Frame 8 also has a negative value and is thus accumulated, however, because the transition was detected on Frame 7, no new transition has taken place. Frame 9 is a positive value and is equal to 0.3. The average luminance difference accumulated is reset to 0.3 and, because it's above the threshold a new transition has occurred.

As illustrated, transitions can occur over time, over multiple frames or from one frame to another. To detect transitions over time, the flash trend (increase or decrease) is tracked. The average luminance/red difference are accumulated in the average luminance/red difference accumulated if the trend is continued. If the trend is not continued, the accumulation value is reset to the average luminance/red difference. Transitions occur when the average luminance/red difference accumulated value reaches the flash threshold for either luminance or red saturation.

The mean difference is accumulated if the flash trend remains the same or if there has been no variation among consecutive frames. Otherwise, the flash accumulation is reset to the new mean difference value. This compliance criteria may define a flash rate that can be applied to any second of the video data. As such the average difference is accumulated by sign and the number of flashes can be tracked in a list. This way, whenever a full second of the video has been analyzed, the latest average difference value is removed from the list and subtracted from the total accumulated value. This process remains as long as the list size equals the amount of frames in one second, meaning that if the flash trend is reset (the tendency has changed) or the list has not reached the size of frames in one second, this step is skipped.

The accumulation is tracked for a defined time period, such as one second. If a video that lasted 3 seconds would only increase in red saturation, the average red difference accumulated would not be the sum of all the values of the 3 seconds. It would be the sum of the values of the moment (frame) that's being checked up to one second before.

The pseudocode below illustrates an embodiment of an algorithm for flash value accumulation and transition detection. The algorithm returns a new transition once it has been detected.

```
if SameSign(lastMeanDiffAcc, meanDiff ) then
  |    if meanDiffInSecond.Count == meanDiffInSecond.Capacity then
  |      | lastMeanDiffAcc=meanDiffInSecond[0];
  |      | meanDiffInSecond.Remove(0);
  |    end
  |    meanDiffInSecond.Add(mea
  |    nDiff); meanDiff +=
       lastMeanDiffAcc;
  a.       else
  |    meanDiffInSecond.Clear( );
  |      meanDiffInSecond.Add(meanDiff);
  b.       end
  newTransition = IsFlashTransition(lastMeanDiffAcc, meanDiff);
       lastMeanDiffAcc = meanDiff; //new start acc value
return newTransition;
```

Transition Count

The transition count is used to determine the number of transitions within a defined time period of the video. The compliance criteria provides the number of the transitions that can occur within the defined time period. For example, some compliance criteria may require that flashing at more than 3 Hz (3 flashes per second) is not permitted at any given second of the video. Flashing between 2-3 Hz tor 5 continuous seconds (over 4 seconds) can also violate the compliance criteria.

A time period of one second would means that at any frame in the video, the transition count is based on everything that occurred up to one second before the selected frame. Luminance and red saturation have separate transition count for the same time period.

Whenever a transition is detected (when the average difference accumulation surpasses the flash threshold), a counter will add a new transition. This counter will only go up until a second has passed. At this moment, the transitions that are no longer part of the second won't be part of the counter.

FIG. 8A is an example illustrating how the PDS determines the count of flash transitions at any frame within the video. The table has three columns representing the frame position from an analyzed video recorded at 4 FPS. The column "New Transition" indicates when a transition was detected and the "Transition Count" column indicates the count of transitions that are present at that frame of the video. Frame 0 is the first frame of the video and is used as the initial baseline for the analysis.

This example video was recorded at 4 FPS, one second of the video is composed of 4 frames. The transition count is like:

Frame 0: initial state, no transitions can be detected in this frame.

Frame 1: no transition detected, transition count remains the same.

Frame 2: transition detected, the transition count is incremented by one. There is 1 transition present at this moment of the video.

Frame 3: transition detected, the transition count is incremented by one. There are 2 transitions present at this moment of the video.

Frame 4: transition detected, the transition count is incremented by one, frame O is no longer part of the 1 second moment of the video (frames 1, 2, 3, 4 are part of the current second that's being analyzed). There are 3 transitions present at this moment of the video.

Frame 5: transition detected, the transition count is incremented by one, frame 1 is no longer part of the 1 second moment of the video (frames 2, 3, 4, 5 are). There are 4 transitions present at this moment of the video.

Frame 6: no transition detected, transition count remains the same, frame 2 is no longer part of the 1 second moment of the video (frames 3, 4, 5, 6 are). There are 3 transitions present in this moment of the video.

Frame 7: transition detected, the transition count is incremented by one, frame 3 is no longer part of the 1 second moment of the video (frames 4, 5, 6, 7 are). There are 4 transitions present at this moment of the video.

Frame 8: transition detected, the transition count is incremented by one, frame 4 is no longer part of the 1 second moment of the video (frames 5, 6, 7, 8 are). There are 4 transitions present in this moment of the video.

The transition count is equal to the "yes" count in the "New Transition" column that take place from the selected frame and up to 3 frames before (a total of 4 frames that is defined by the video's FPS). This way, the PDS can determine the transition count at any frame of the video.

The transition count is used to check if flashing is above the flash threshold or not. For extended flash failure there is a similar counter to check its threshold. In this case though, the counter is a time counter that increments based on the amount of time when where the transition count is between 4 and 6, not when a new transition is detected. The extended flash counter represents the number of frames that are flashing at between 2-3 flashes in any moment of the video. When the counter surpasses the extended flash threshold, such as at 5 seconds, an extended flash fail occurs. The extended flash threshold can be any time period with a defined number of transitions. For example, the extended flash threshold time period can be 5 seconds and the transition threshold for incrementing the counter can be between 4 and 6.

Analysis Results

Analysis results are obtained by checking the analysis data against the compliance criteria. The compliance criteria cand define the number of flashes that can be present within a defined time period. If the criteria is not satisfied, the video fails the corresponding luminance or red saturation photosensitivity flash test. The criteria can include multiple categories for analyzing the video, such as a flash test, extended flash test, pass with warning, or pass.

Example compliance criteria can provide that no flashing may occur at more than 3 Hz, and that extended flashing for 5 seconds can also be harmful. As a flash is defined as a pair of opposing transitions, any given second of the video that surpasses 6 transitions will fail against the compliance criteria. Also, any period of time that reaches at least 4 seconds of flashing (meaning the 5th has been reached) between 2 and 3 Hz will be an extended flash failure.

When there are 6 transitions, flashing is at more than 3 Hz, a flash incident has occurred, and the frame is marked as a flash fail. If not, anytime the number of transitions is above 4, which means flashing at least at 2 Hz, the amount of frames in the extended failure list is increased, if it extends for 4 seconds of the video, an extended failure incident will have occurred, and thus the frame is marked as an extended failure. In some embodiments, two Boolean variables can be used to set them to true in case a flash incident or an extended failure incident occur. This way, both types of flash incidents can be reported to the user when the video analysis ends.

Example results include:

Pass: the transition count was never above the threshold and there were not enough transitions over time to generate an extended flash failure.

Pass with Warning: failure thresholds were not reached but there was flashing between 2 and 3 Hz (4-6 transitions).

Extended Flash Failure: there was flashing between 2 and 3 Hz for 5 consecutive seconds in the video.

Flash Failure: the transition count was above 6 transitions (7 and above) within a one second time period.

Figure 8B:
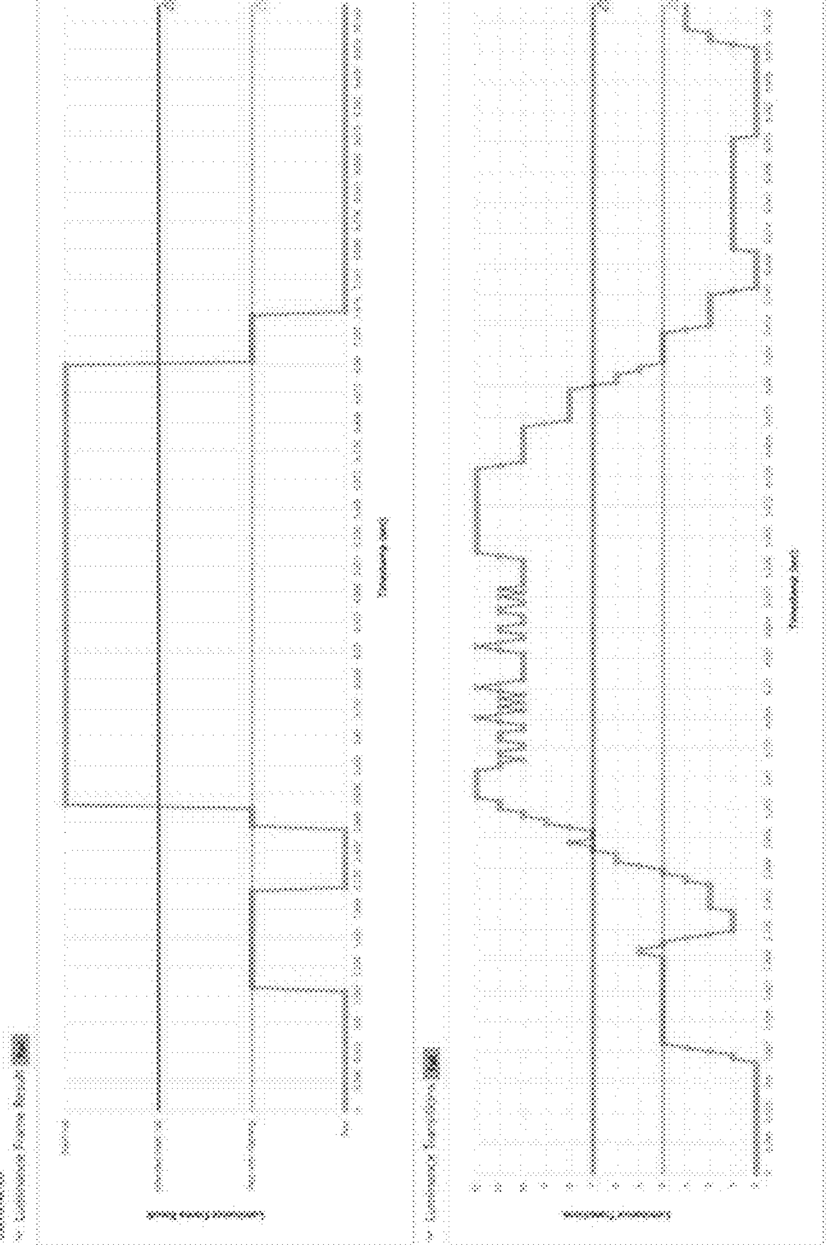
Figure 15:
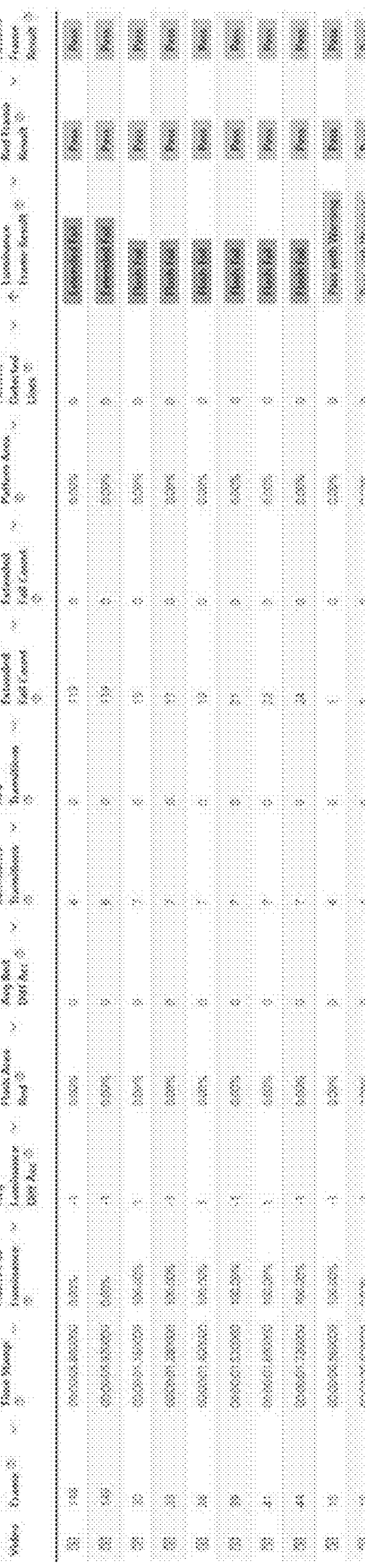
FIG. 15 illustrates an example of photosensitivity analysis results.

An illustration of the analysis results is illustrated in FIG. 8B. The results can be output a graph, as illustrated, as a spreadsheet, such as illustrated in FIG. 15, or another format capable of displaying the results of each analysis.

Flash Detection Process

Figure 9:
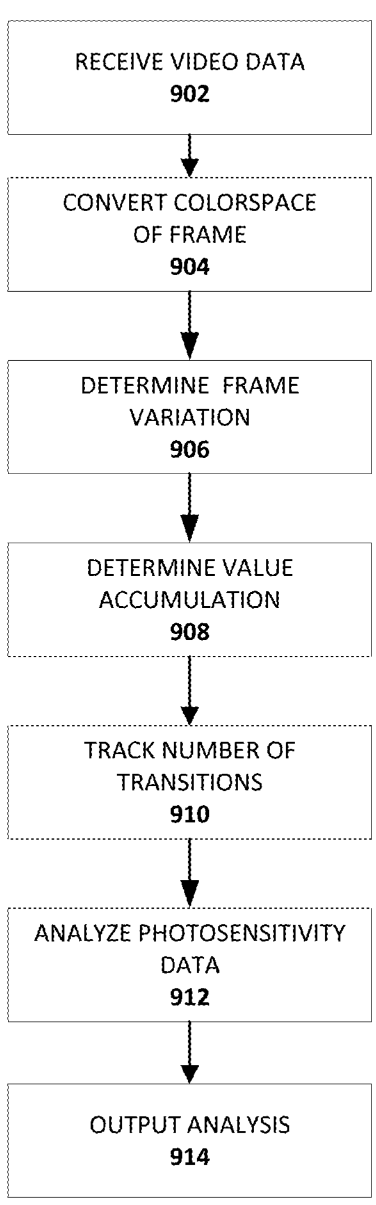
FIG. 9 illustrates a flowchart of an example process for a flash detection analysis for luminance or red saturation.

FIG. 9 illustrates a flowchart of an example process for a flash detection analysis for luminance or red saturation. The process 900, in whole or in part, can be implemented by a PDS 250, a luminance calculation module 260, a flash detection module 270, luminance detection module 272, red saturation detection module 274, or other computing system. Although any number of systems, in whole or in part, can implement the process 900, to simplify discussion, the process 900 will be describe with respect to the PDS 250.

At block 902, the PDS receives video data for analysis. The video data includes a plurality of frames. In some instances, the video data may be in the form of a file with a discreet file size having a defined video length. In some instances, the video data may be collected during runtime of an application, such as a video game, which can continuously generate frames. The video data may be stored in a video buffer, such as a ring buffer. In such an instance, the PDS may continually analyze the video data during runtime. Optionally, the PDS may scale the frame to allow for faster processing of the video data. The scaling can be performed to reduce processing load and account for a limited processing budget during runtime of the application. For example, each frame of the video data may be down scaled to a defined resolution.

At block 904, the PDS converts each frame of the video from RGB color space values to luminance at the display (cd/m2), relative luminance, or to red saturation values.

At block 906, the PDS checks flash variations throughout frames of the video to determine whether they satisfy a flash area threshold. The PDS can obtain the variation area by calculating the differences between consecutive frames in order to determine the amount of area change. The area change can be the pixels that have changed in value from one frame to the next. The amount of area change is compared to the flash area threshold, such as 25% of the frame. If the area is equal or higher than the flash area threshold, the average luminance/red difference can be calculated, otherwise it can be disregarded or set to 0.

At block 908, the PDS accumulates average values of variation throughout any second of the video to check flash thresholds in order to determine if an opposing change (a flash transition) has occurred. The PDS can calculate the average luminance/red saturation in the frame. The PDS can accumulate the average difference to determine the transition trend. If the average difference accumulated surpasses the flash threshold, a new transition is detected.

At block 910, the PDS tracks the number of transitions that have occurred over a defined time period. The transitions are tracked so that the number of transitions is updated based on a rolling time period. For example, if the time period is one second, the number of transitions tracked for a specific frame is based on the number of transitions that occurred within one second prior to the selected frame.

At block 912, the PDS analyses the photosensitivity data. The amount of transitions in each moment of the video are checked against the compliance criteria to determine the result of the video. If the amount tracked transitions in any moment are above the flash failure threshold, the video will fail for flash failure. The flash failure threshold defines a maximum number of flashes or transitions that can occur within a defined time period, such as, for example, 6 transitions (above 3 flashes as any flash is composed of two transitions) within one second. If the amount tracked transitions in any moment are above the extended flash failure threshold, the video will fail for extended flash failure. The extended flash failure threshold defines a time period and a number of flashes/transitions within time period, such as, for example, between 4 and 6 (2 Hz-3 Hz) for 4 seconds or longer.

At block 914, the PDS outputs the results of the analysis. The PDS can generate an output of the analysis for review by a user The analysis result may be output within a user interface, such as an interface of a video game, a video player application, an overlay within the video player/game, another application, or stored as a separate file. Some examples are illustrated in FIGS. 8A, 8B, and 15.

Pattern Detection

The pattern detection module 280 can be configured to detect patterns within a video, such as of a video game. The pattern detection process can run in parallel with the flash detection processes (luminance/red saturation) as illustrated in FIG. 4A. As with the flash detection algorithm, the video is read frame by frame, and each frame goes through the pattern detection flow. Once all the pattern data has been generated (area, number of stripes and average stripe luminance), the compliance criteria are checked to give the pass or fail result of the video, depending on whether the compliance criteria has been satisfied.

Detect Pattern

Figure 10A:
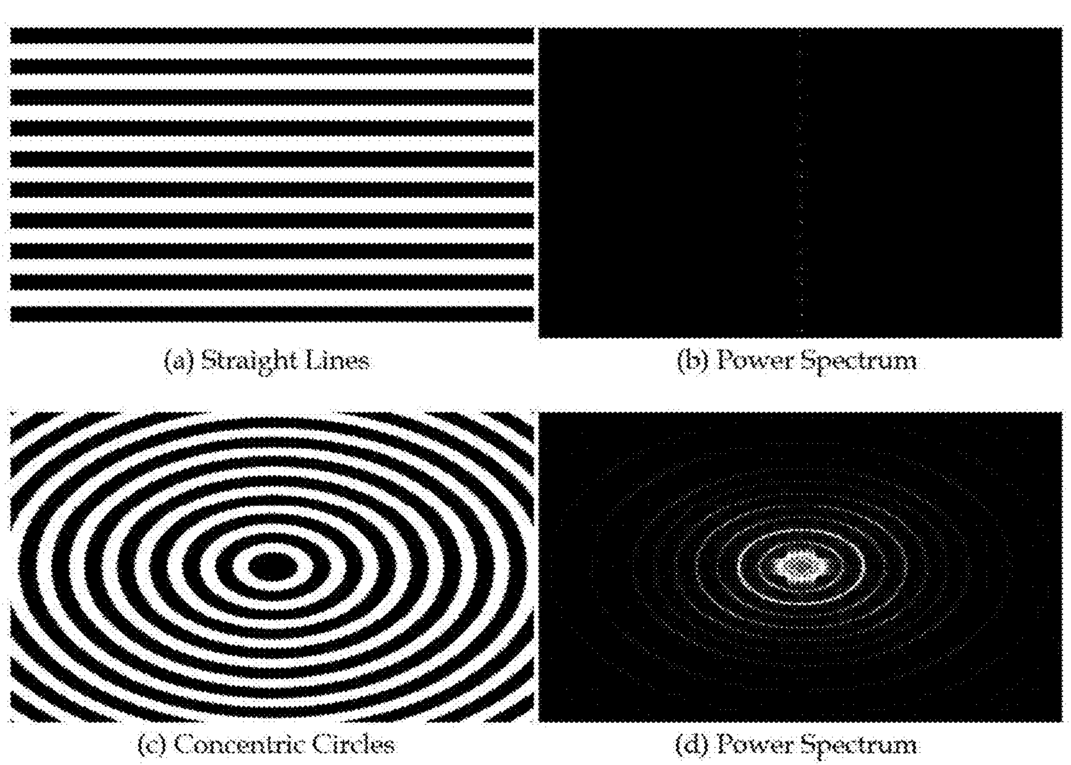
FIG. 10A illustrates examples of different types of patterns displayed next to their corresponding power spectrum.

FIG. 10A illustrates an example of various pattern types that may be detected during a video game. There are multiple variations to geometric patterns that need to be detected by the PDS. In order to analyze a pattern, the pattern needs to be identified and validated within frames of the video. Patterns can be reduced to sets of components (e.g., lines), straight or curved, that are composed of similar discernible stripes with similar luminance values and that occupy a certain area of the screen display. In other words, patterns are regular, periodic and have clear contrast between the components that compose them.

The frames of the video can be converted from RGB color space to grayscale. When executing the pattern detection process, the video frame are in the RGB color space. The first task is to convert the frames to grayscale (a single channel matrix with values ranging from 0 to 255).

Because two key features of epileptogenic patterns are regularity and periodicity, performing a Fourier analysis on the grayscale video frame allows detecting patterns without the need of executing line or contour detection operations. Although line or contour detection operations are useful, they increase the processing time of a frame due to needing to firstly obtain the edges of a frame, perform both detection algorithms, then perform a series of steps to analyze the detected lines and regions for similarity to ensure that a valid pattern has been detected.

A Fourier Transform of the frame can be used to generate pattern frequencies that identify whether a frame contains a defined pattern. Once the Fourier transform of the grayscale frame is computed and the magnitude spectrum is obtained, the power spectrum is calculated. The power spectrum is equal to the squared magnitude. The power spectrum enhances the higher amplitudes acting as a filter, displaying the peaks of interest.

As the frame contains a repetitive periodic signal (i.e., the pattern), the pattern frequencies will be present with a higher amplitude in the magnitude spectrum. In FIG. 10A, different types of patterns are displayed next to their corresponding power spectrum. The power spectrum, which is the squared magnitude, is used to better display the magnitude. In the respective power spectrum of each pattern, it can be observed the corresponding repetitive frequencies that signify that the space domain (the image) contains a pattern signal. Because repetitive signals present in the space domain will be present in the frequency domain, the latter can be used to detect patterns irrespective of their shape. The high amplitude frequencies correspond to the pattern frequencies.

Figure 10B:
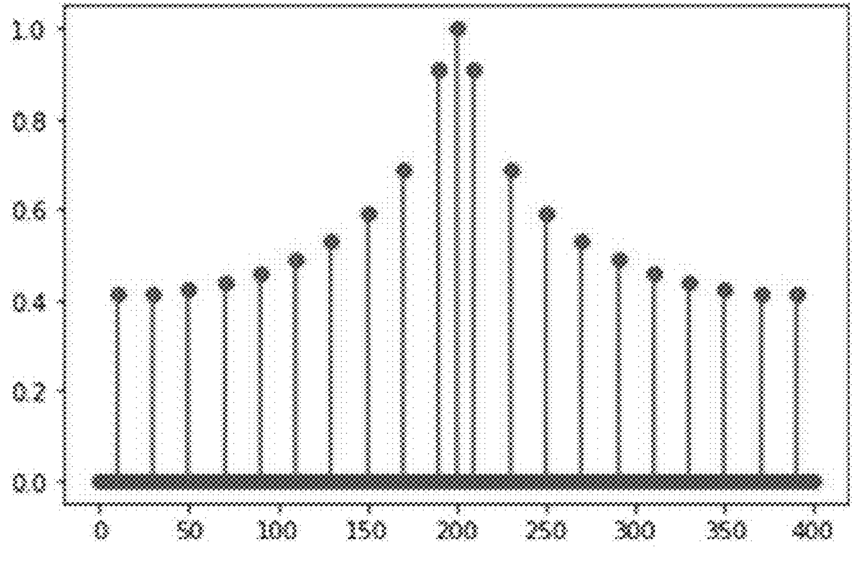
FIG. 10B illustrates an example of a power spectrum graph.

The highest amplitude frequency also corresponds to the amount of lines that a pattern is composed of. The graph in FIG. 10B displays the values of the middle column of the straight lined pattern's power spectrum in FIG. 10A. The image's dc component is at the center of the graph and is always equal to 1. The next highest amplitude frequency before the Nyquist is in position 190, symmetrically after Nyquist, the highest frequency is in position 210, indicating that the present pattern has a total of 20 stripes. Nevertheless, although the position of the peaks determines accurately the amount of stripes, if half the pattern is present in the space image the plotted graph would still be the same as it corresponds to the same signal, even if it's partially present. The peaks can be used to detect patterns but not to validate their number of stripes precisely. The magnitude spectrum allows us to determine whether a pattern or not is present in the space domain image if high periodic peaks are present in the spectrum as shown in FIG. 10B.

Figure 12A:
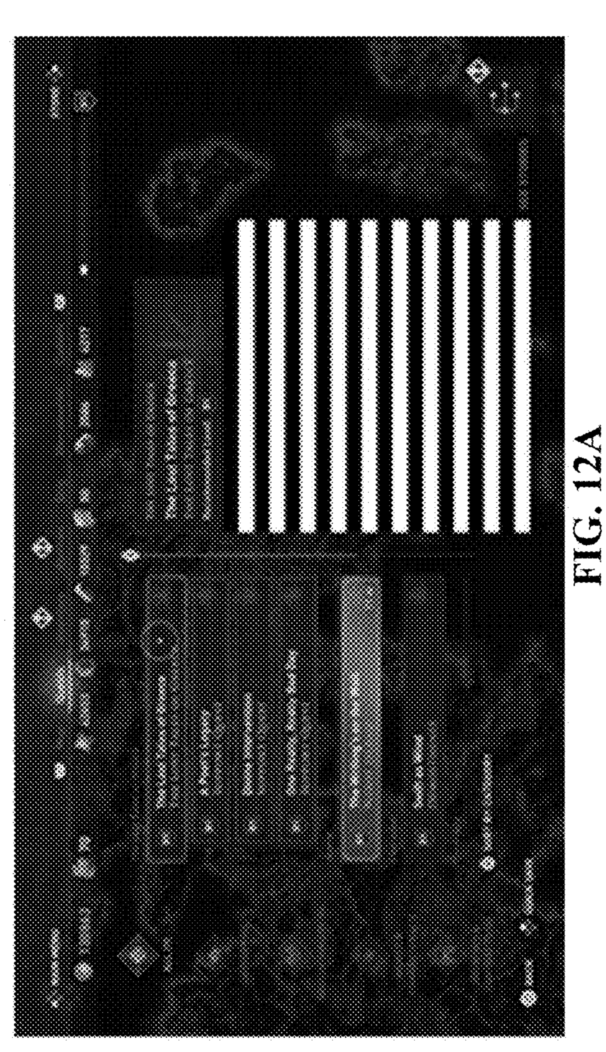
FIG. 12A-12F illustrates examples of game play menus within a video game and examples of operations that can be used for detecting and validating patterns within a frame.
Figure 12B:
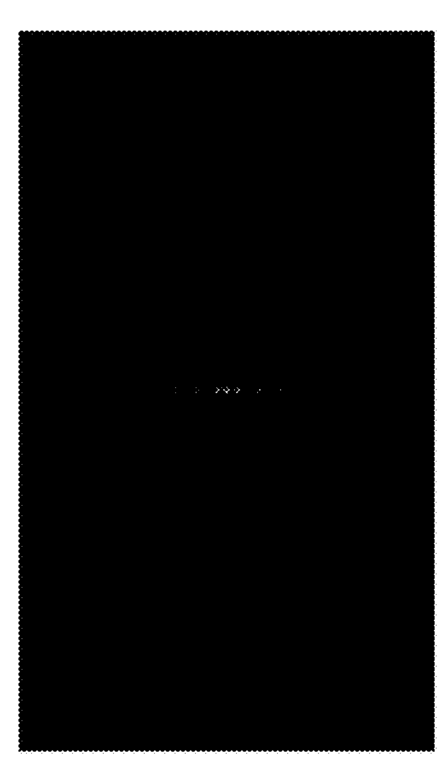
Figure 12B:
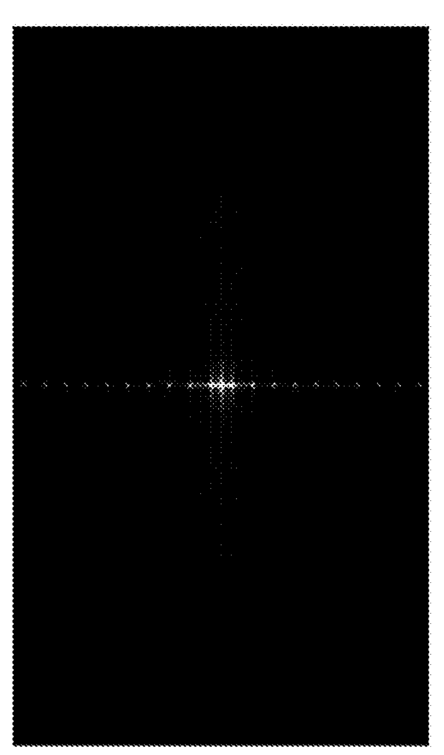

If a pattern is present in the video frame, its spatial frequencies will be present in the magnitude spectrum. The pattern detection method includes filtering the magnitude spectrum by removing the pattern's spatial frequencies in order to obtain the pattern region. FIG. 12A is an image of one of the game play menus within a video game with an artificial straight lined pattern inserted into the image. The figures will be used as an example of the procedure to detect patterns through masking the magnitude spectrum and obtaining the pattern region. A binary threshold as can be applied to the spectrum to obtain a mask of the peaks of the pattern. To better threshold the spectrum, it can be normalized between 0 and 255 before applying the threshold. When the threshold is applied, the low amplitude frequencies are removed as seen in FIG. 12B. The binary threshold of the power spectrum is used to mask the magnitude by removing all the elements (setting them to 0) that correspond to the white pixels of the thresholded power spectrum. This way the high amplitude frequencies of the pattern are removed from the magnitude.

Figure 11A:
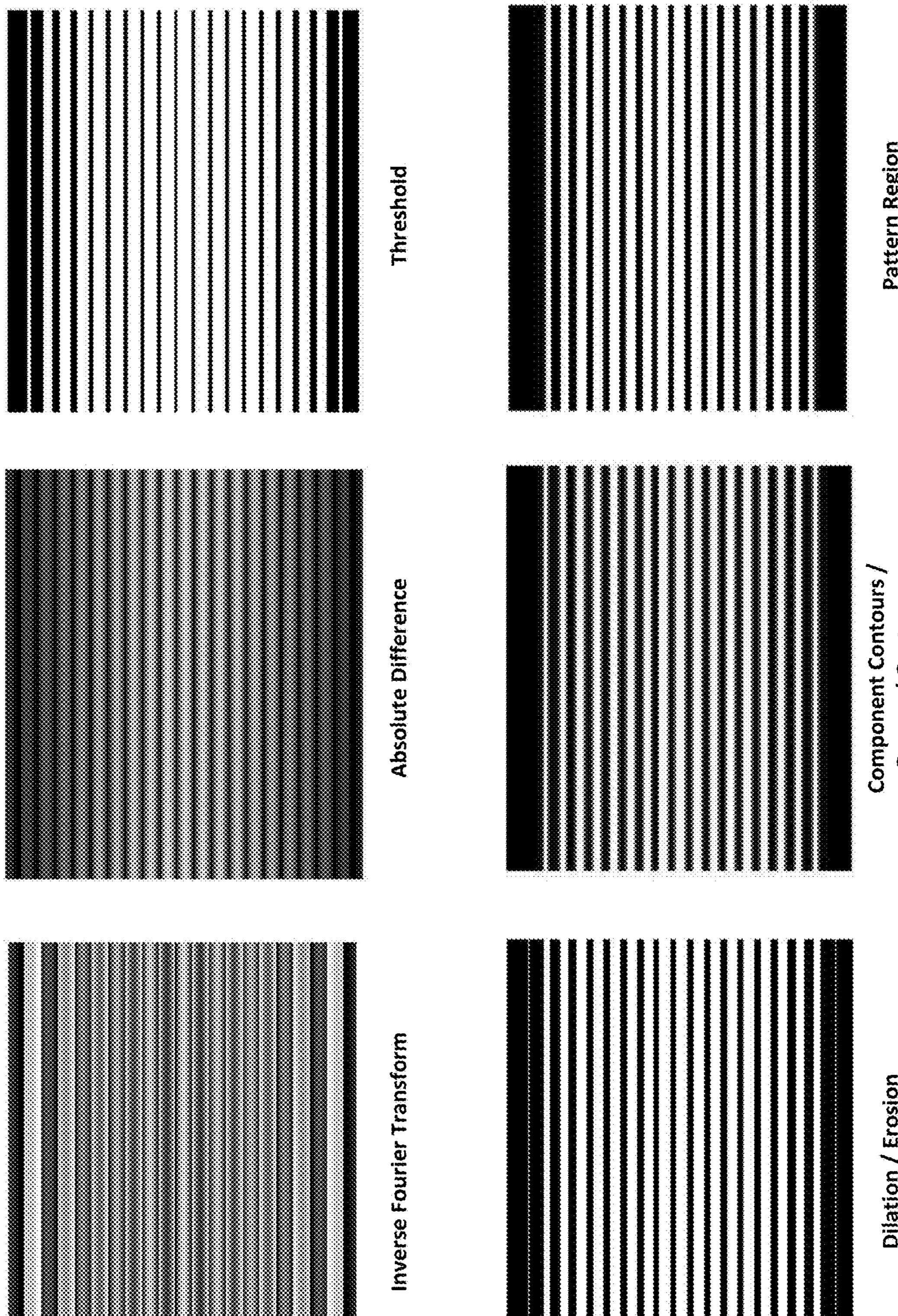
FIGS. 11A-B illustrates examples of operations that can be used for detecting and validating patterns within a frame.
Figure 11B:
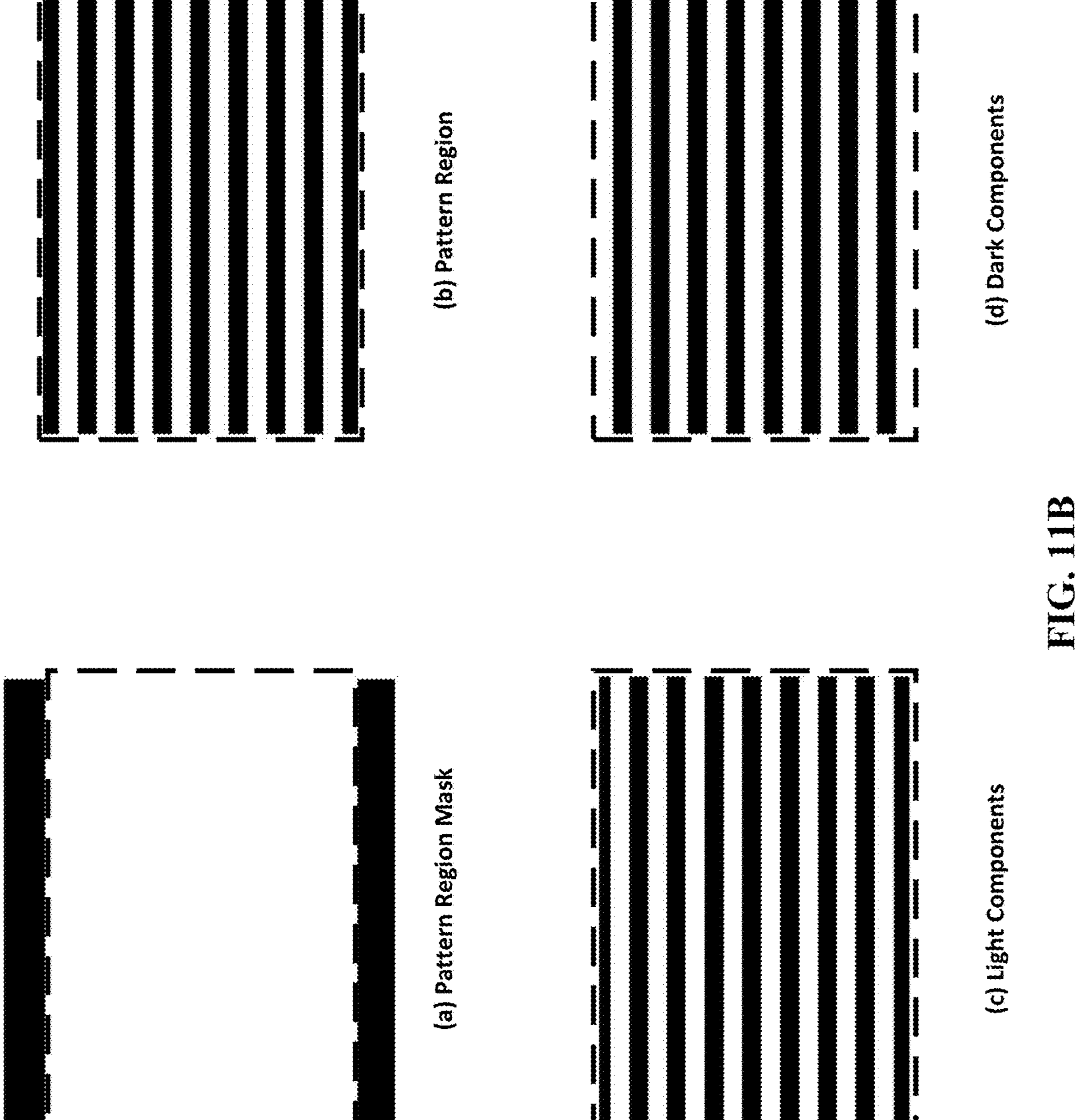
Figure 12C:
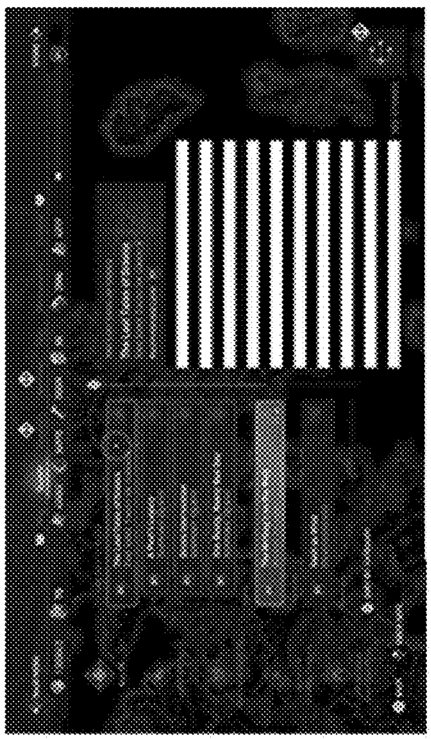
Figure 12C:
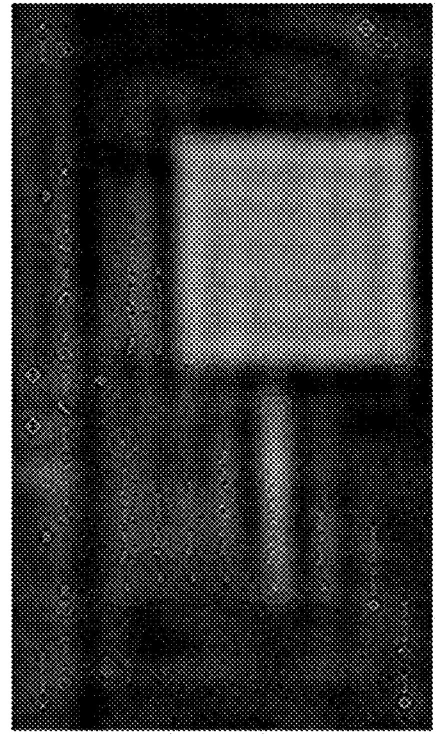
Figure 12D:
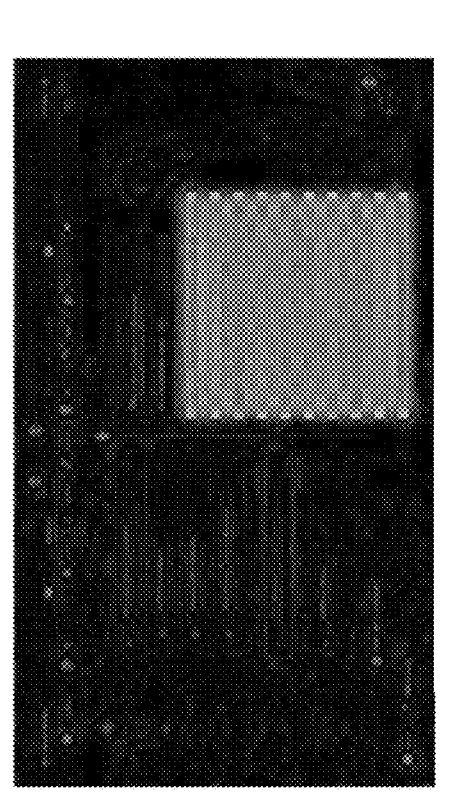
Figure 12D:
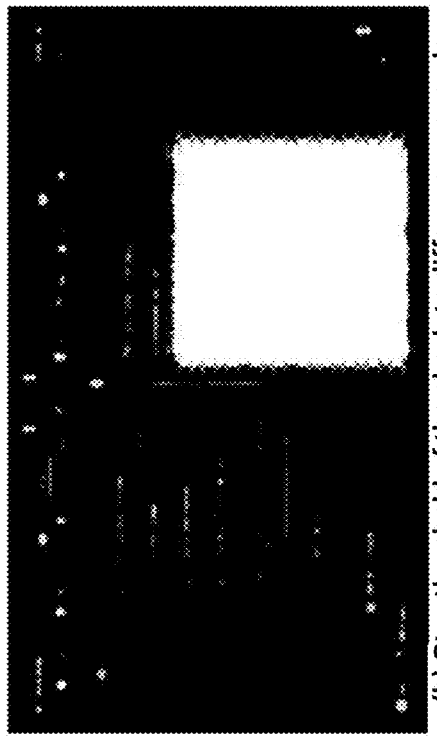

With additional reference to FIG. 11 and FIGS. 12C-12F, additional operations that can be used for detecting patterns within a frame are shown. When performing an inverse Fourier Transform, the reconstructed image is the same as the original before the transform was applied. When the magnitude has been filtered, the inverse Fourier Transform won't be the same as the original. The area of the frame that will suffer the most change is the area of the pattern. In FIG. 12C the original grayscale image can be observed next to the reconstructed image from the inverse Fourier transform, where the area with the most difference is the pattern area.

To locate the pattern region, the area with the most change needs to be enhanced. The task can be done by computing the absolute difference between the original grayscale image and the obtained inverse Fourier Transform. In the resulted absolute difference, the pattern region is clearly observable as can be appreciated in FIG. 12D. A threshold for the absolute difference matrix (the result of the difference between the original frame and the reconstructed image) can result in the highlighting of the pattern components while keeping them separated. So that the pattern is not composed of an entire white area but of separated lines, such as illustrated in FIG. 11A.

To obtain the location, the contours of the pattern are needed to obtain the pattern's region of interest. Before performing the contour detection algorithm, an absolute difference image can be converted into a binary image using an Otsu threshold. The Otsu algorithm tries to find a threshold value to separate foreground and background by maximizing inter-class variance of the pixel intensity. In some embodiments, the changes between images of lower value will be discarded and the rest will be set to white.

Figures 12E, 12F:
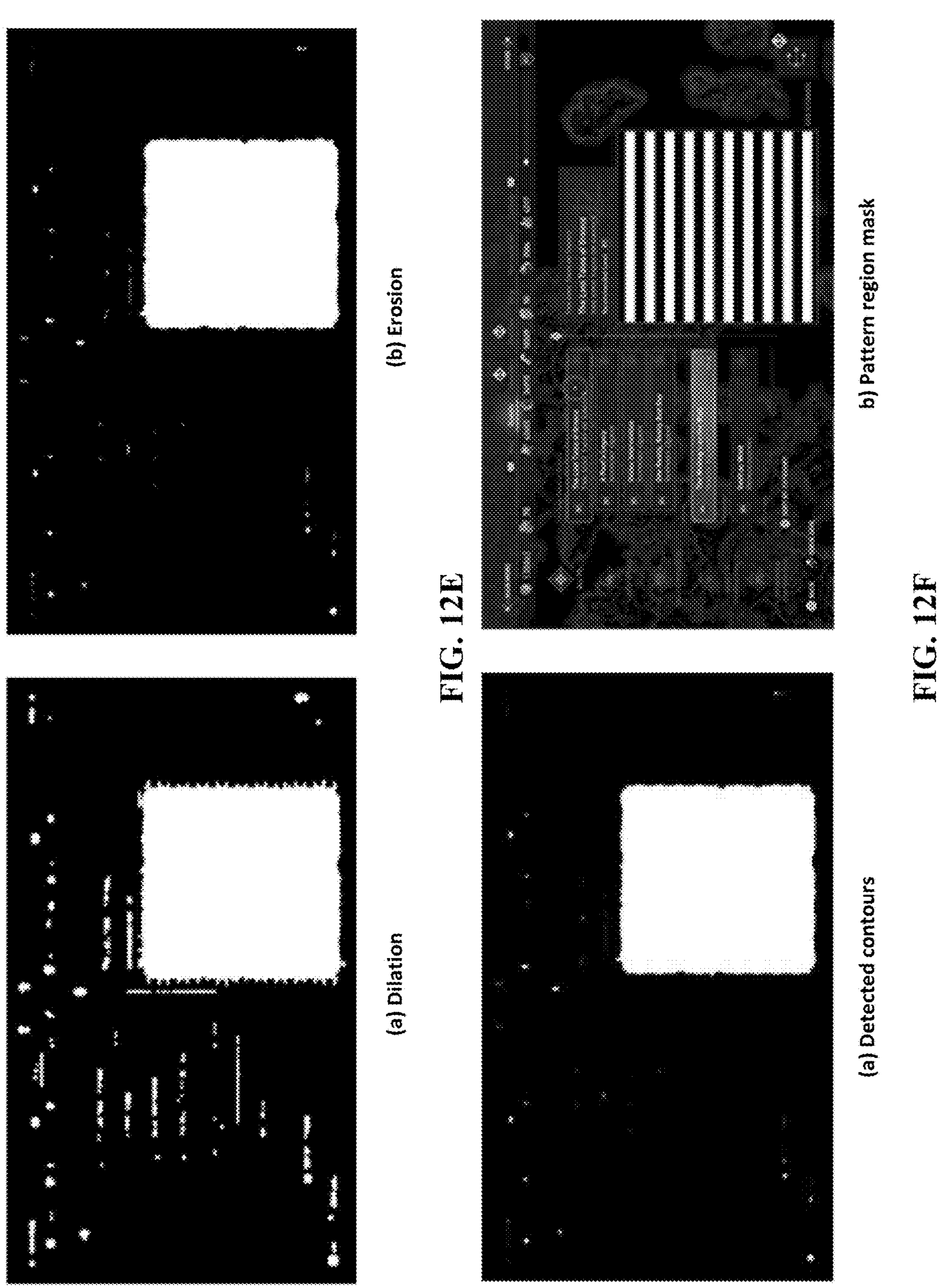

Afterwards, both dilation and erosion operations are performed to better define the region of the pattern. Both are morphological operations that apply a structuring element to an input image. FIG. 12E show these steps. Erosion can be performed on to further separate the pattern components and to reduce in size any small parts that managed to pass the threshold from the absolute difference.

Now the contour detection can be applied. Contour detection can be run on the eroded matrix. Contours that are considered small are discarded and are not considered part of the pattern, the rest of the contours are grouped by shape similarity. This step ensures that any big contour areas that don't belong to the pattern that could still have passed the thresholds are discarded. With the list of detected contours, those of smaller size can be discarded and the biggest will be the contour corresponding to the pattern region. The amount of grouped contours represent the amount of components in the pattern. The combined area of the grouped contours is that of the pattern area. A pattern region mask can be used to identify the pattern area within the frame. In FIG. 12F, the pattern region mask of the selected contour determines the location of the detected pattern and its region.

In the case where a video frame does not contain a pattern, no significant filter would be applied to the magnitude as there would be not high amplitude peaks in the spectrum. Thus, there would be barely any difference with the original grayscale frame and the reconstructed one, meaning that no pattern region would be detected.

Pattern Validation

After the pattern region mask has been generated, the PDS can analyze the detected pattern to validate the components of the pattern. FIG. 11B illustrates steps of the validation process. At (a), the contours of the pattern region mask illustrate the generated mask for the pattern region that encompasses the light components and the dark components. At (b), the pattern region is illustrated that is within the pattern region mask. At (c) and (d) the PDS can analyze the light and dark components to determine the pattern data, such as the number of components, pattern area, and luminance of the components.

To determine the number of components in the pattern, an Otsu threshold can be applied to the pattern region in the grayscale image. The threshold separates the stripes by setting the lighter ones to white. The negative of the threshold corresponds to the darker stripes.

By counting each set of continuous pixel elements in each matrix, in the threshold and the inverted threshold matrices, the number of light and dark component is obtained. As the component have been separated during pattern detection, the matrices of both types of components are used as masks on the luminance matrix. With each set of components filtered on the luminance matrix, the average luminance is calculated for each set, obtaining the average luminance of the darker and lighter components. The PDS can compute the average luminance of the components from the luminance, and the relative luminance between the light and dark components within the pattern.

Pattern Criteria

Once the pattern region is detected and validated, the pattern criteria can be obtained. The pattern criteria can be based on (i) number of repeating elements (e.g., 5 pairs of stripes or more), (ii) pattern area threshold (e.g., 25% or more of the screen display), and (iii) threshold luminance difference in relative luminance between the lighter and darker stripes (e.g., 0.1). If a pattern violates the criteria, it may be potentially harmful, the harmful pattern can only be displayed for less than a threshold period of time (e.g., 0.5 seconds).

Once the pattern data has been gathered (number of lines, pattern area, and luminance of the light and dark components), the photosensitivity data generated during pattern detection process can be analyzed to determine if the pattern is compliant or not. A similar sliding window of time is used to the one for the flash detection, in which if there are non-compliant patterns for the threshold period of time (e.g., 0.5 seconds) or more in any given moment of the video, the video fails the pattern detection check. Thus, the criteria can help determine whether a pattern is potentially harmful and can include: pattern area, number of stripes, luminance of the lighter components, and luminance of the darker components.

Analysis Results

Patterns that violate compliance criteria should not be displayed any longer than the threshold period of time of a video continuously. The check criteria for patterns follow the same procedure as the flash criteria check, using the transition count. Analysis results are obtained by checking the analysis data against the compliance criteria. The compliance criteria can establish what is considered an unacceptable pattern.

If the pattern satisfies the pattern thresholds for a harmful pattern, the count of harmful pattern frames is tracked. If the count is equal to the amount of frames in the threshold period of time (e.g., half a second) of the video, the last frame in the count and all harmful frames afterwards are set as failed frames. A Boolean variable can be used to be set to true if a harmful pattern sequence is detected, as to later inform the user of the pattern incident. An illustration of the analysis results is illustrated in FIG. 13.

Pattern Detection Process

Figure 14:
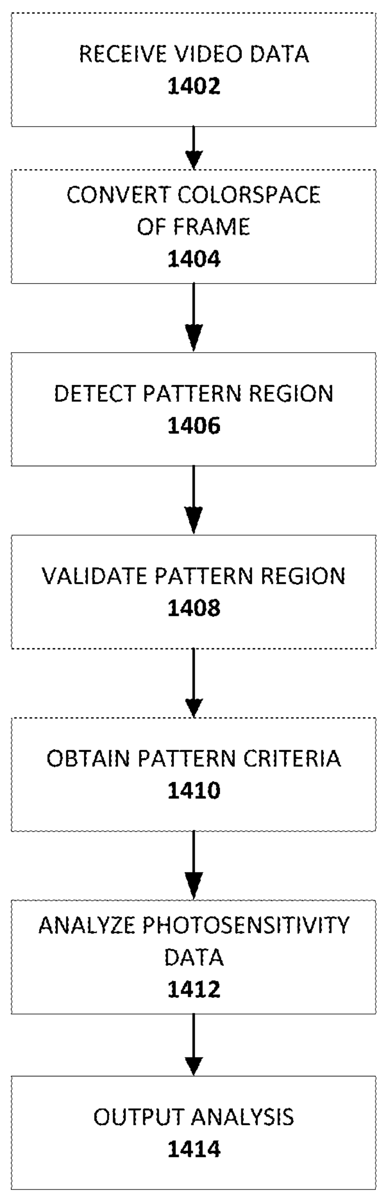
FIG. 14 illustrates a flowchart of an example process for a pattern detection analysis.

FIG. 14 illustrates a flowchart of an example process for a pattern detection analysis. The process 1400, in whole or in part, can be implemented by a PDS 250, a pattern detection module 280, or other computing system. Although any number of systems, in whole or in part, can implement the process 1400, to simplify discussion, the process 1400 will be describe with respect to the PDS 250.

At block 1402, the PDS receives video data for analysis. The video data includes a plurality of frames. In some instances, the video data may be in the form of a file with a discreet file size having a defined video length. In some instances, the video data may be collected during runtime of an application, such as a video game, which can continuously generate frames. The video data may be stored in a video buffer, such as a ring buffer. In such an instance, the PDS may continually analyze the video data during runtime. Optionally, the PDS may scale the frame to allow for faster processing of the video data. The scaling can be performed to reduce processing load and account for a limited processing budget during runtime of the application. For example, each frame of the video data may be down scaled to a defined resolution.

At block 1404, the PDS converts each frame of the video from RGB color space values to grayscale. The video frames are in the RGB color space. The frames is converted to grayscale, which can be a single channel matrix with values ranging from 0 to 255.

At block 1406, the PDS detects the pattern region. This procedure highlights the pattern area (if there is a pattern in the image). The process can use the pattern detection steps as described with respect to FIGS. 10A-11A and 12A-12F. The detected pattern region can be output for further processing as a pattern region mask.

At block 1408, the PDS validates a pattern within pattern region. Once the region has been detected, the pattern area, number of components and luminance of the components can be determined to check the compliance criteria. The PDS can extract the dark and light components of pattern to obtain number of components, pattern area within the frame, and average luminance of dark and light stripes.

At block 1410, the PDS obtains the pattern criteria. The pattern criteria can define (i) number of repeating elements (e.g., 5 pairs of stripes or more), (ii) pattern area threshold (e.g., 25% or more of the screen display), and (iii) threshold luminance difference in relative luminance between the lighter and darker elements (e.g., 0.1). If a pattern is considered harmful, the harmful pattern can only be displayed for less than a threshold period of time (e.g., 0.5 seconds). The PDS can determine the type of pattern and identity the harmful pattern criteria associated with the pattern type.

At block 1412, the PDS analyses the photosensitivity data. Analysis results are obtained by checking the analysis data against the pattern criteria. The pattern criteria establishes what is considered a potentially harmful pattern. If the pattern satisfies the pattern thresholds for a potentially harmful pattern, the count of frames that include the identified pattern is tracked. If the count is equal to the amount of frames in the threshold period of time (e.g., half a second) of the video, the last frame in the count and all frames afterwards that would continue to violate the compliance criteria are set as failed frames.

At block 1414, the PDS outputs the results of the analysis. The PDS can generate an output of the analysis for review by a user The analysis result may be output within a user interface, such as an interface of a video game, a video player application, an overlay within the video player/game, another application, or stored as a separate file. Some examples are illustrated in FIGS. 13 and 15.

Analysis Output Sample

The PDS collects data generated by the video analysis and outputs it for review. The analysis result may be output within a user interface, such as an interface of a video game, a video player application, an overlay within the video player/game, another application, or stored as a separate file. This helps users understand the incidents that have occurred throughout a video as it includes a set of information per video frame. The PDS can output a persistent file containing the analysis, such as a CSV file, or any other type of persistent file. The output includes frame information (frame data) which allows consulting detail information of any photosensitive incidents that were detected in the video analysis. The frame data can include data associated with the video analysis, such as, for example:

Frame index, Time stamp, Average luminance, Average luminance difference, Average luminance accumulated difference, Luminance flash area, Average red, Average red difference, Average red accumulated difference, Red flash area, Luminance transitions, Red Transitions, Luminance extended fail count, Red extended fail count, Luminance frame result, Red frame result, Pattern detected, Pattern area, Pattern line number, Pattern frame result, and/or other values generated by the PDS.

With these data, graphs can be plotted to better understand the evolution of the incidents throughout the length of the video. The result frames attributes for flashes and patterns easily indicate which sections of the video have failed or passed. The flash transition attributes allow knowing how many transitions have occurred in the last second. If needed, the evolution of flashes can be tracked with the accumulated and frame difference attributes, as it allows understanding how the frame values have evolved. And the frame index and time stamp allow to easily view the frame either by its frame position or time position in the video.

Computing Device

Figure 16:
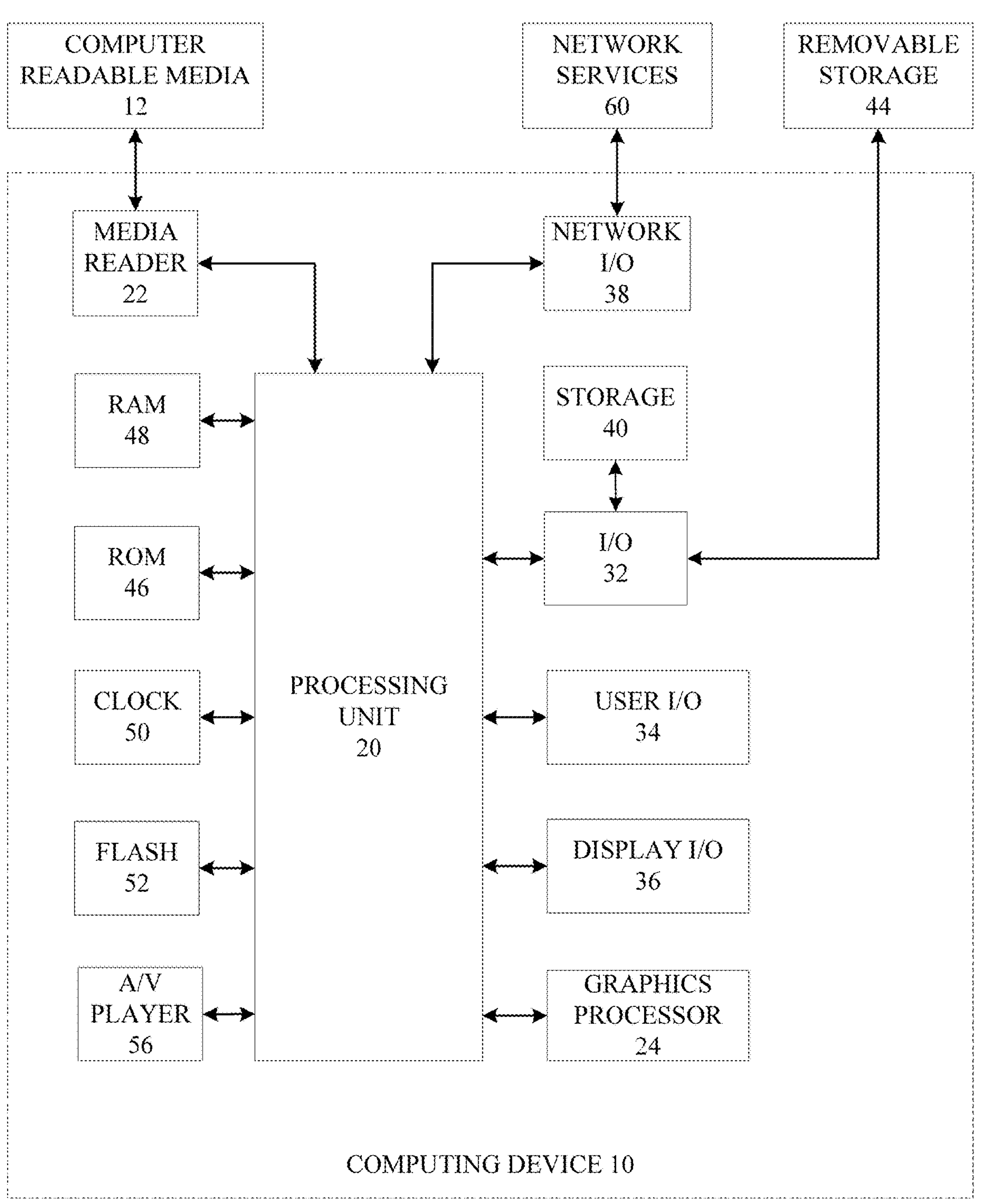
FIG. 16 illustrates an example embodiment of a computing device.

FIG. 16 illustrates an example embodiment of the resources within a computing device 10. In some embodiments, some or all of the aforementioned hardware devices—such as computing devices 110 and server devices 130 of FIG. 1—are similar to computing device 10, as known to those of skill in the art.

Other variations of the computing device 10 may be substituted for the examples explicitly presented herein, such as removing or adding components to the computing device 10. The computing device 10 may include a video game console, a smart phone, a tablet, a personal computer, a laptop, a smart television, a server, and the like.

As shown, the computing device 10 includes a processing unit 20 that interacts with other components of the computing device 10 and external components. A media reader 22 is included that communicates with computer readable media 12. The media reader 22 may be an optical disc reader capable of reading optical discs, such as DVDs or BDs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O can include a touchscreen. The touchscreen can be a capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, GUIs, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such as display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48, or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The disclosed subject matter also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may be provided as a computer program product, or software, that may include a machine-readable medium having stored thereon instructions, which may be used to program a computer system (or other electronic devices) to perform a process according to the disclosed subject matter. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

One set of example embodiments of systems and methods of flash detection of the disclosure can be described by the following clauses:

Clause 1. A system comprising: one or more processors; and one or more memory devices, wherein the one or more memory devices are communicatively coupled to the one or more processors, the one or memory devices storing computer-executable instructions including at least an automated photosensitivity flash detection module, wherein execution of the computer-executable instructions configure the one or more processors to: receive video data comprising a plurality video frames arranged sequentially, each of individual frames comprising a plurality of pixels; convert each frame of the video from a colorspace to a detection value; determine a frame variance between consecutive frames, wherein the frame variance determines a portion of the frame that between the consecutive frames; determine whether the frame variance satisfies a flash area threshold, wherein the flash area threshold is a percentage of a total area of the frame; determine average frame variation values for the plurality of frames; accumulate the average frame variation values for the plurality of video frames; determine flash transitions for the plurality of video frames based on the average frame variation values; track a number of flash transitions over a defined time period throughout the plurality of video frames; determine whether the number of flash transitions satisfies at least one flash threshold for the video data; and output an indication of whether the video data satisfies the at least one flash threshold.

Clause 2. The system of clause 1, wherein a transition occurs when the accumulation of the average frame variation values of multiple frames satisfies a flash transition threshold.

Clause 3. The system of clause 2, wherein execution of the computer-executable instructions further configure the one or more processors to set a flash trend based at least in part on the accumulation of the average frame variation values.

Clause 4. The system of clause 2, wherein a flash is detected when two transitions occur.

Clause 5. The system of clause 1, wherein the detection value is a luminance value or a red saturation value.

Clause 6. The system of clause 5, wherein execution of the computer-executable instructions further configure the one or more processors to determine whether the number of flash transitions satisfies at least one flash threshold for the video data for red saturation and luminance independently.

Clause 7. The system of clause 1, wherein the at least one flash threshold comprises a maximum flash threshold and an extended flash threshold, wherein the maximum flash threshold is a first number of flashes within a first defined time period, and the extended flash threshold is a second number of flashes within a second defined time period.

Clause 8. The system of clause 7, wherein the maximum flash threshold is three flashes over any one second time period of the video data.

Clause 9. The system of clause 1, wherein a flash transition occurs when the accumulation of the average frame variation values satisfy a transition threshold.

Clause 10. The system of clause 9, wherein the transition threshold for luminance is different the transition threshold for red saturation.

Clause 11. A computer-implemented method to for photosensitivity flash detection comprising: receiving video data comprising a plurality video frames arranged sequentially, each of individual frames comprising a plurality of pixels; converting each frame of the video from a colorspace to a detection value; determining a frame variance between consecutive frames, wherein the frame variance determines a portion of the frame that between the consecutive frames; determining whether the frame variance satisfies a flash area threshold, wherein the flash area threshold is a percentage of a total area of the frame; determining average frame variation values for the plurality of frames; accumulating the average frame variation values for the plurality of video frames; determining flash transitions for the plurality of video frames based on the average frame variation values; tracking a number of flash transitions over a defined time period throughout the plurality of video frames; determining whether the number of flash transitions satisfies at least one flash threshold for the video data; and outputting an indication of whether the video data satisfies the at least one flash threshold.

Clause 12. The method of clause 11, wherein a transition occurs when the accumulation of the average frame variation values of multiple frames satisfies a flash transition threshold.

Clause 13. The method of clause 12 further comprising setting a flash trend based at least in part on the accumulation of the average frame variation values.

Clause 14. The method of clause 12, wherein a flash is detected when two transitions occur.

Clause 15. The method of clause 11, wherein the detection value is a luminance value or a red saturation value.

Clause 16. The method of clause 15 further comprising determining whether the number of flash transitions satisfies at least one flash threshold for the video data for red saturation and luminance independently.

Clause 17. The method of clause 11, wherein the at least one flash threshold comprises a maximum flash threshold and an extended flash threshold, wherein the maximum flash threshold is a first number of flashes within a first defined time period, and the extended flash threshold is a second number of flashes within a second defined time period.

Clause 18. The method of clause 17, wherein the maximum flash threshold is three flashes over any one second time period of the video data.

Clause 19. The method of clause 11, wherein a flash transition occurs when the accumulation of the average frame variation values satisfy a transition threshold.

Clause 20. A non-transitory computer readable medium storing instructions that, when executed by one or more processors, causes to perform a method comprising: receiving video data comprising a plurality video frames arranged sequentially, each of individual frames comprising a plurality of pixels; converting each frame of the video from a colorspace to a detection value; determining a frame variance between consecutive frames, wherein the frame variance determines a portion of the frame that between the consecutive frames; determining whether the frame variance satisfies a flash area threshold, wherein the flash area threshold is a percentage of a total area of the frame; determining average frame variation values for the plurality of frames; accumulating the average frame variation values for the plurality of video frames; determining flash transitions for the plurality of video frames based on the average frame variation values; tracking a number of flash transitions over a defined time period throughout the plurality of video frames; determining whether the number of flash transitions satisfies at least one flash threshold for the video data; and outputting an indication of whether the video data satisfies the at least one flash threshold.

One set of example embodiments of systems and methods of pattern detection of the disclosure can be described by the following clauses:

Clause 1. A system comprising: one or more processors; and one or more memory devices, wherein the one or more memory devices are communicatively coupled to the one or more processors, the one or memory devices storing computer-executable instructions including at least an automated photosensitivity pattern detection module, wherein execution of the computer-executable instructions configure the one or more processors to: receive video data comprising a plurality video frames arranged sequentially, each of the individual frames comprising a plurality of pixels; convert each frame of the video from a first colorspace to a second colorspace; for each frame within the video data, detect a pattern region within the frame; validate a pattern within the pattern region of the frame; determine whether the pattern violates a pattern criteria; in response to a determination that the pattern violates the pattern criteria within the frame, track a number of frames that include the pattern; determine whether the number of frames satisfies at least one pattern threshold for the video data; and output an indication of whether the video data satisfies the at least one pattern threshold.

Clause 2. The system of clause 1, wherein the pattern criteria defines a number of repeating elements, a pattern area threshold, and a threshold luminance difference in relative luminance between lighter and darker elements of the pattern.

Clause 3. The system of clause 1, wherein the at least one pattern threshold defines a threshold period of time, wherein execution of the computer-executable instructions further configure the one or more processors to determine whether the pattern is displayed for greater than the threshold period of time.

Clause 4. The system of clause 1, wherein to detect a pattern region within the frame, execution of the computer-executable instructions further configure the one or more processors to, determine a Fourier transform of the frame; determine a magnitude spectrum based on the Fourier transform; determine a power spectrum based on the Fourier transform; and detect a pattern region of the pattern based at least in part on the magnitude spectrum and the power spectrum.

Clause 5. The system of clause 4, wherein to detect a pattern region within the frame, execution of the computer-executable instructions further configure the one or more processors to, determine an inverse Fourier transform of the frame to generate a modified image of the frame; determine an absolute difference between the frame and the modified frame; and detect the pattern region based at least in part on an absolute difference threshold applied to the difference between the frame and the modified frame.

Clause 6. The system of clause 5, wherein to detect a pattern region within the frame, execution of the computer-executable instructions further configure the one or more processors to, convert the modified image into a binary image using an Otsu threshold; apply at least one of dilation or erosion operations to the binary image resulting in an eroded image; apply a contour operation on the eroded image; and generate a pattern region mask based at least in part on the contour operation, wherein the pattern region mask defines boundaries of the pattern region within the frame.

Clause 7. The system of clause 1, wherein to validate a pattern within the pattern region of the frame, execution of the computer-executable instructions further configure the one or more processors to, determine a number of dark and light components of the pattern; determine an average luminance of the dark and light components of the pattern; and determine a relative luminance between the dark and light components of the pattern.

Clause 8. The system of clause 7, wherein execution of the computer-executable instructions further configure the one or more processors to determine the number of dark and light components of the pattern using an Otsu threshold.

Clause 9. The system of clause 1, wherein execution of the computer-executable instructions further configure the one or more processors to determine a pattern area based on the pattern region and determine whether the pattern area satisfies a pattern area threshold.

Clause 10. The system of clause 1, wherein the first colorspace is RGB and the second colorspace is greyscale.

Clause 11. A computer-implemented method to for photosensitivity flash detection comprising: receiving video data comprising a plurality video frames arranged sequentially, each of the individual frames comprising a plurality of pixels; converting each frame of the video from a first colorspace to a second colorspace; for each frame within the video data, detecting a pattern region within the frame; validating a pattern within the pattern region of the frame; determining whether the pattern violates a pattern criteria; in response to a determination that the pattern violates the pattern criteria within the frame, tracking a number of frames that include the pattern; determining whether the number of frames satisfies at least one pattern threshold for the video data; and outputting an indication of whether the video data satisfies the at least one pattern threshold.

Clause 12. The method of clause 11, wherein the pattern criteria defines a number of repeating elements, a pattern area threshold, and a threshold luminance difference in relative luminance between lighter and darker elements of the pattern.

Clause 13. The method of clause 11, wherein the at least one pattern threshold defines a threshold period of time, and further comprising determining whether the pattern is displayed for greater than the threshold period of time.

Clause 14. The method of clause 11, wherein detecting a pattern region within the frame, further comprises, determining a Fourier transform of the frame; determining a magnitude spectrum based on the Fourier transform; determining a power spectrum based on the Fourier transform; and detecting a pattern region of the pattern based at least in part on the magnitude spectrum and the power spectrum.

Clause 15. The method of clause 14, wherein detecting a pattern region within the frame, further comprises, determining an inverse Fourier transform of the frame to generate a modified image of the frame; determining an absolute difference between the frame and the modified frame; and detecting the pattern region based at least in part on an absolute difference threshold applied to the difference between the frame and the modified frame.

Clause 16. The method of clause 15, wherein detecting a pattern region within the frame, further comprises, converting the modified image into a binary image using an Otsu threshold; applying at least one of dilation or erosion operations to the binary image resulting in an eroded image; applying a contour operation on the eroded image; and generating a pattern region mask based at least in part on the contour operation, wherein the pattern region mask defines boundaries of the pattern region within the frame.

Clause 17. The method of clause 11, wherein validating a pattern within the pattern region of the frame, further comprises: determining a number of dark and light components of the pattern; determining an average luminance of the dark and light components of the pattern; and determining a relative luminance between the dark and light components of the pattern.

Clause 18. The method of clause 17 further comprising determining the number of dark and light components of the pattern using an Otsu threshold.

Clause 19. The method of clause 11 further comprising determining a pattern area based on the pattern region and determine whether the pattern area satisfies a pattern area threshold.

Clause 20. A non-transitory computer readable medium storing instructions that, when executed by one or more processors, causes to perform a method comprising: receiving video data comprising a plurality video frames arranged sequentially, each of the individual frames comprising a plurality of pixels; converting each frame of the video from a first colorspace to a second colorspace; for each frame within the video data, detecting a pattern region within the frame; validating a pattern within the pattern region of the frame; determining whether the pattern violates a pattern criteria; in response to a determination that the pattern violates the pattern criteria within the frame, tracking a number of frames that include the pattern; determining whether the number of frames satisfies at least one pattern threshold for the video data; and outputting an indication of whether the video data satisfies the at least one pattern threshold.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

What is claimed is:

1. A system comprising:
one or more processors; and
one or more memory devices, wherein the one or more memory devices are communicatively coupled to the one or more processors, the one or more memory devices storing computer-executable instructions including at least an automated photosensitivity pattern detection module, wherein execution of the computer-executable instructions configure the one or more processors to:
receive video data comprising a plurality of video frames arranged sequentially, each individual frame comprising a plurality of pixels;
convert each frame of the video data from a first colorspace to a second colorspace;
for each frame within the video data,
detect a pattern region within the frame;
validate a pattern within the pattern region of the frame;
determine whether the pattern violates a pattern criteria;
in response to a determination that the pattern violates the pattern criteria within the frame, track a number of frames that include the pattern;
determine whether the number of frames satisfies at least one pattern threshold for the video data; and
output an indication of whether the video data satisfies the at least one pattern threshold.

2. The system of claim 1, wherein the pattern criteria defines a number of repeating elements, a pattern area threshold, and a threshold luminance difference in relative luminance between lighter and darker elements of the pattern.

3. The system of claim 1, wherein the at least one pattern threshold defines a threshold period of time, wherein execution of the computer-executable instructions further configure the one or more processors to determine whether the pattern is displayed for greater than the threshold period of time.

4. The system of claim 1, wherein to detect a pattern region within the frame, execution of the computer-executable instructions further configure the one or more processors to,
determine a Fourier transform of the frame;
determine a magnitude spectrum based on the Fourier transform;
determine a power spectrum based on the Fourier transform; and
detect a pattern region of the pattern based at least in part on the magnitude spectrum and the power spectrum.

5. The system of claim 4, wherein to detect a pattern region within the frame, execution of the computer-executable instructions further configure the one or more processors to,
determine an inverse Fourier transform of the frame to generate a modified image of the frame;
determine an absolute difference between the frame and the modified frame; and
detect the pattern region based at least in part on an absolute difference threshold applied to the difference between the frame and the modified frame.

6. The system of claim 5, wherein to detect a pattern region within the frame, execution of the computer-executable instructions further configure the one or more processors to,
convert the modified image into a binary image using an Otsu threshold;
apply at least one of dilation or erosion operations to the binary image resulting in an eroded image;
apply a contour operation on the eroded image; and
generate a pattern region mask based at least in part on the contour operation, wherein the pattern region mask defines boundaries of the pattern region within the frame.

7. The system of claim 1, wherein to validate a pattern within the pattern region of the frame, execution of the computer-executable instructions further configure the one or more processors to, determine a number of dark and light components of the pattern;

determine an average luminance of the dark and light components of the pattern; and determine a relative luminance between the dark and light components of the pattern.

8. The system of claim 7, wherein execution of the computer-executable instructions further configure the one or more processors to determine the number of dark and light components of the pattern using an Otsu threshold.

9. The system of claim 1, wherein execution of the computer-executable instructions further configure the one or more processors to determine a pattern area based on the pattern region and determine whether the pattern area satisfies a pattern area threshold.

10. The system of claim 1, wherein the first colorspace is RGB and the second colorspace is greyscale.

11. A computer-implemented method to for photosensitivity flash detection comprising:

receiving video data comprising a plurality video frames arranged sequentially, each individual frame comprising a plurality of pixels;

converting each frame of the video data from a first colorspace to a second colorspace;

for each frame within the video data, detecting a pattern region within the frame;

validating a pattern within the pattern region of the frame;

determining whether the pattern violates a pattern criteria;

in response to a determination that the pattern violates the pattern criteria within the frame, tracking a number of frames that include the pattern;

determining whether the number of frames satisfies at least one pattern threshold for the video data; and outputting an indication of whether the video data satisfies the at least one pattern threshold.

12. The method of claim 11, wherein the pattern criteria defines a number of repeating elements, a pattern area threshold, and a threshold luminance difference in relative luminance between lighter and darker elements of the pattern.

13. The method of claim 11, wherein the at least one pattern threshold defines a threshold period of time, and further comprising determining whether the pattern is displayed for greater than the threshold period of time.

14. The method of claim 11, wherein detecting a pattern region within the frame, further comprises, determining a Fourier transform of the frame;

determining a magnitude spectrum based on the Fourier transform;

determining a power spectrum based on the Fourier transform; and detecting a pattern region of the pattern based at least in part on the magnitude spectrum and the power spectrum.

15. The method of claim 14, wherein detecting a pattern region within the frame, further comprises, determining an inverse Fourier transform of the frame to generate a modified image of the frame;

determining an absolute difference between the frame and the modified frame; and detecting the pattern region based at least in part on an absolute difference threshold applied to the difference between the frame and the modified frame.

16. The method of claim 15, wherein detecting a pattern region within the frame, further comprises, converting the modified image into a binary image using an Otsu threshold;

applying at least one of dilation or erosion operations to the binary image resulting in an eroded image;

applying a contour operation on the eroded image; and generating a pattern region mask based at least in part on the contour operation, wherein the pattern region mask defines boundaries of the pattern region within the frame.

17. The method of claim 11, wherein validating a pattern within the pattern region of the frame, further comprises:

determining a number of dark and light components of the pattern;

determining an average luminance of the dark and light components of the pattern; and determining a relative luminance between the dark and light components of the pattern.

18. The method of claim 17 further comprising determining the number of dark and light components of the pattern using an Otsu threshold.

19. The method of claim 11 further comprising determining a pattern area based on the pattern region and determine whether the pattern area satisfies a pattern area threshold.

20. A non-transitory computer readable medium storing instructions that, when executed by one or more processors, causes to perform a method comprising:

receiving video data comprising a plurality of video frames arranged sequentially, each individual frame comprising a plurality of pixels;

converting each frame of the video data from a first colorspace to a second colorspace;

for each frame within the video data, detecting a pattern region within the frame;

validating a pattern within the pattern region of the frame;

determining whether the pattern violates a pattern criteria;

in response to a determination that the pattern violates the pattern criteria within the frame, tracking a number of frames that include the pattern;

determining whether the number of frames satisfies at least one pattern threshold for the video data; and outputting an indication of whether the video data satisfies the at least one pattern threshold.

* * * * *